US012619432B1

(12) United States Patent (10) Patent No.: US 12,619,432 B1

Lee (45) Date of Patent: May 5, 2026

(54) METHOD AND APPARATUS FOR OBTAINING A PHYSICAL ADDRESS FROM A LOGICAL ADDRESS USING RECURSIVE DIVISION

(71) Applicant: Marvell Asia Pte Ltd, Singapore (SG)

(72) Inventor: Sean Lee, San Jose, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 23 days.

(21) Appl. No.: 18/641,833

(22) Filed: Apr. 22, 2024

Related U.S. Application Data

(60) Provisional application No. 63/462,811, filed on Apr. 28, 2023.

(51) Int. Cl.
*G06F 9/30* (2018.01)
*G06F 7/72* (2006.01)
*G06F 12/02* (2006.01)

(52) U.S. Cl.
CPC ............ *G06F 9/3001* (2013.01); *G06F 7/721* (2013.01); *G06F 9/30065* (2013.01); *G06F 12/0246* (2013.01)

(58) Field of Classification Search
CPC .. G06F 12/0246; G06F 9/3001; G06F 9/3004; G06F 7/721; G06F 9/30065; G06F 2212/7201; G06F 12/10
USPC ............... 711/E12.008, 202, 103, 206, 203, 711/E12.001, 170, 100, E12.061, 200
See application file for complete search history.

(56) References Cited

U.S. PATENT DOCUMENTS

| | | |
|---|---|---|
| 5,721,855 A | 2/1998 | Hinton et al. |
| 6,405,303 B1 | 6/2002 | Miller et al. |
| 6,438,664 B1 | 8/2002 | McGrath et al. |
| 6,553,485 B2 | 4/2003 | Janik et al. |
| 7,114,058 B1 | 9/2006 | Trivedi et al. |
| 10,282,103 B1 | 5/2019 | Stone et al. |
| 10,558,490 B2 | 2/2020 | Ronen et al. |
| 11,016,929 B2 | 5/2021 | Ray et al. |
| 11,494,094 B2 | 11/2022 | Hong et al. |
| 11,537,457 B2 | 12/2022 | Pappachan et al. |
| 11,797,196 B2 | 10/2023 | Hong et al. |
| 2007/0180310 A1 | 8/2007 | Johnson et al. |
| 2008/0114937 A1 | 5/2008 | Reid et al. |
| 2009/0168525 A1 | 7/2009 | Olbrich et al. |
| 2010/0125708 A1* | 5/2010 | Hall .................... G06F 12/1036 711/135 |
| 2014/0359629 A1 | 12/2014 | Ronen et al. |
| 2015/0212935 A1* | 7/2015 | Roeder ............... G06F 12/0246 711/103 |
| 2018/0027062 A1 | 1/2018 | Bernat et al. |
| 2018/0213441 A1 | 7/2018 | Mehta et al. |
| 2019/0042234 A1 | 2/2019 | Bernat et al. |

(Continued)

OTHER PUBLICATIONS

U.S. Appl. No. 18/641,838, filed Apr. 22, 2024, Sean Lee.

(Continued)

*Primary Examiner* — Jared I Rutz
*Assistant Examiner* — Edward Waddy, Jr.

(57) ABSTRACT

A recursive divide operation is performed on a logical address for a predetermined number of iterations. On each iteration of the recursive divide operation, a respective component of a physical address represented by the logical address is derived. The physical address corresponding to the logical address is the constructed from the derived components.

32 Claims, 11 Drawing Sheets

1100

(56) References Cited

U.S. PATENT DOCUMENTS

| | | |
|---|---|---|
| 2020/0014560 A1 | 1/2020 | Tørudbakken et al. |
| 2021/0048991 A1 | 2/2021 | Tanner |
| 2021/0064987 A1 | 3/2021 | Springer et al. |
| 2021/0109758 A1 | 4/2021 | Francois et al. |
| 2021/0191724 A1 | 6/2021 | Pal et al. |
| 2021/0318920 A1 | 10/2021 | Pappachan et al. |
| 2022/0075627 A1 | 3/2022 | Foley |
| 2022/0100680 A1 | 3/2022 | Chrysos et al. |
| 2023/0035828 A1 | 2/2023 | Hong et al. |
| 2023/0038919 A1 | 2/2023 | Wesslen et al. |
| 2024/0320011 A1 | 9/2024 | Lee et al. |
| 2025/0362884 A1 | 11/2025 | Sangeneni |

OTHER PUBLICATIONS

U.S. Appl. No. 18/612,608, filed Mar. 21, 2024, Sean Lee.
Partial European Search Report, EP Application No. 23185526.3, Dec. 19, 2023.
Extended European Search Report, EP Application No. 23185526.3, Mar. 12, 2024.
Foreign Office Action, EP Application No. 23185526.3, May 15, 2025.

* cited by examiner

| DW | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| 0 | Opcode | | | | | OT | OS | NITR | | | | | | R | Data 1 (ptr) | | | | | | | | | | Data 0 (ptr) | | | | Result | | | |

1100

1102

Receive a logical storage address

1104

N = 1; T = number of iterations

1106

Derive an N$^{th}$ component of a physical address from the logical storage address

1108

Store the derived N$^{th}$ component in memory

1112

N = N+1

1110

N = T?

No

Yes

1114

Construct a physical address from the N derived components

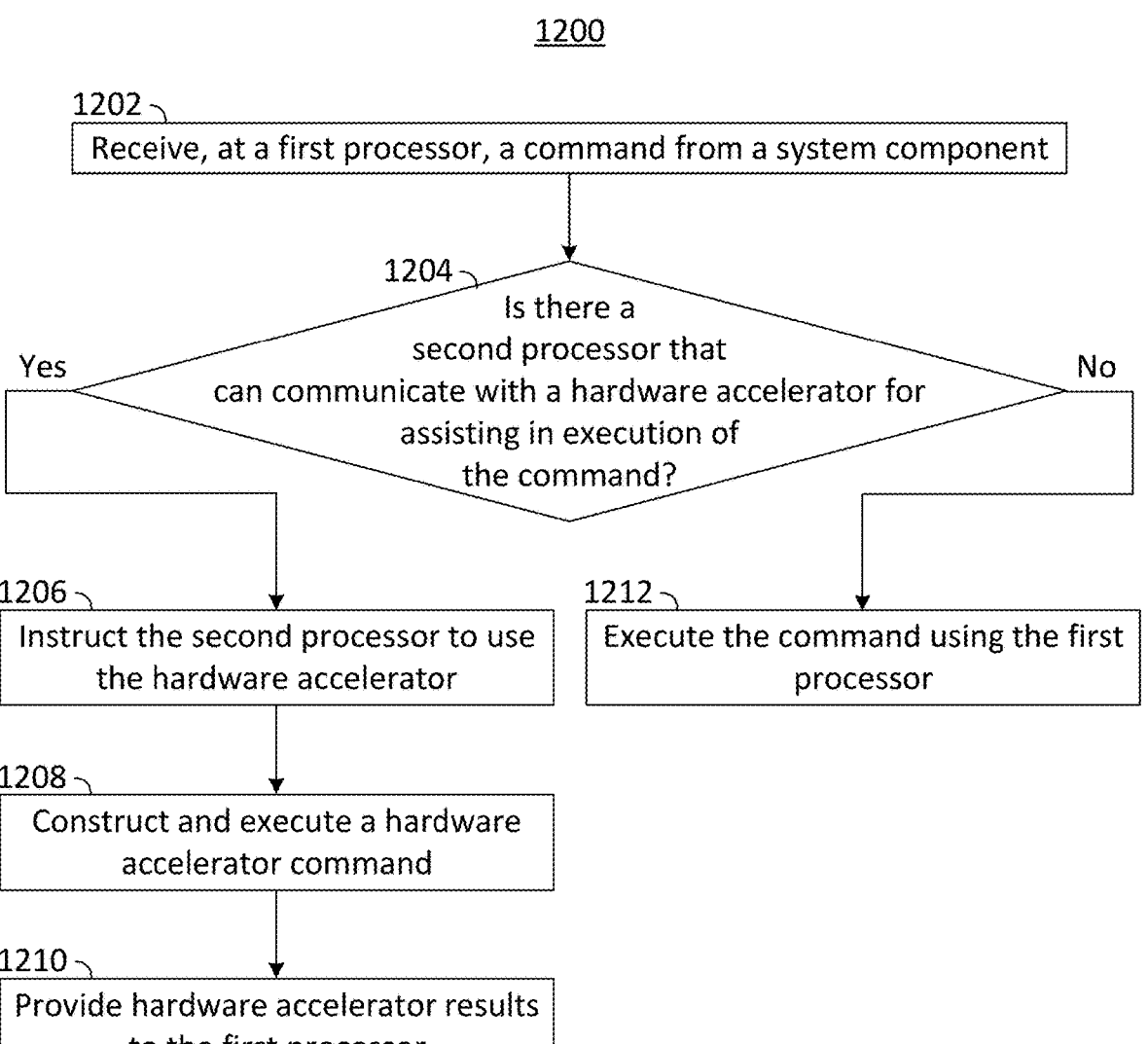

1200

1202 — Receive, at a first processor, a command from a system component

1204 — Is there a second processor that can communicate with a hardware accelerator for assisting in execution of the command?

Yes

No

1206 — Instruct the second processor to use the hardware accelerator

1212 — Execute the command using the first processor

1208 — Construct and execute a hardware accelerator command

1210 — Provide hardware accelerator results to the first processor

FIG. 12

METHOD AND APPARATUS FOR OBTAINING A PHYSICAL ADDRESS FROM A LOGICAL ADDRESS USING RECURSIVE DIVISION

CROSS REFERENCE TO RELATED APPLICATION

This disclosure claims the benefit of commonly-assigned U.S. Provisional Patent Application No. 63/462,811, filed Apr. 28, 2023, which is hereby incorporated by reference herein in its entirety.

FIELD OF USE

This disclosure relates to architectures for a Fast Path Programmable Accelerator (FPA) and obtaining a physical memory address from a logical memory address.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Many computing and electronic devices include non-volatile memory for storing software, applications, or data of the device. Additionally, most users stream data or access services with their devices, such as multimedia content or social media applications, over data networks from various locations or on the move. With users' ever-increasing demand for data and services, storage providers have scaled up capacity and performance of storage drives to support the data access associated with these activities of users and other data storage clients. Typically, a storage drive of a device includes storage media to which data of the device is written and read from. To do so, the device may issue data access requests to the storage drive, which in turn writes the data to or reads the data from the storage media as specified by each request. Thus, storage drive performance generally depends on a rate at which the storage drive is able to complete the data access requests of the device or the storage client.

Generally, hardware of a storage drive is designed to process an average flow of data access requests as quickly as possible. Access patterns of the storage media, however, can vary over a wide array of usage patterns. As such, the hardware of conventional storage drives may not be optimized for access request traffic patterns or flows associated with different applications, user types, multitasking, storage network topologies, and so forth. For example, a large volume of one type of access request may overload the storage drive hardware and create a bottleneck in request processing that slows processing of all other access requests received by the storage drive. Accordingly, when storage drives are deployed with a static hardware configuration, overall storage drive performance is often less than optimal because the storage drive is unable to efficiently handle different types of access request traffic patterns.

In various aspects, processing units of the FPA architecture may manipulate or process any suitable data. In some cases, the FPA architecture enables the access, manipulation, or processing of data in fewer clock or instructions cycles, which may enable more efficient data processing.

SUMMARY

Methods and apparatus are described herein for obtaining a physical address from a logical address using recursive division. A recursive divide operation is performed on a logical address for a predetermined number of iterations. On each iteration of the recursive divide operation, a respective component of a physical address represented by the logical address is derived. The physical address corresponding to the logical address is the constructed from the derived components.

In some implementations, to derive a respective component of the physical address, a divisor associated with the respective component may be retrieved from memory. At least a portion of the logical address is then divided by the divisor to obtain a quotient and a remainder. The remainder represents the respective component of the physical address and the quotient represents a portion of the logical address to be divided in the next iteration of the recursive division operation.

In some implementations, the quotient from a first iteration is stored. During a second iteration, the stored quotient may be retrieved as the at least a portion of the logical address to be divided in the second iteration. In some implementations, each derived component is stored at a respective location in a memory.

In some implementations, a recursive divide instruction may be received. The instruction may include information to be used in executing the instructions. This information may include a number of iterations for which to perform the recursive division, a first pointer identifying a location in a lookup table at which a list of divisors relevant to the instruction begins, a second pointer identifying a location in memory at which a first dividend is stored, and/or third pointer identifying a location in memory at which to begin storing dividends (i.e., quotients to be used in later iterations) obtained from the recursive division.

In some implementations, the physical address is based on characteristics of a storage device. The characteristics may be determined and values corresponding to the characteristics may be stored in a lookup table. Each derived component of the physical address may then represent a respective characteristic, such as channel, die, page, or block to which the physical address points.

Methods and apparatus are also described herein for improved command processing in a multi-processor environment. A command is received at a first processor from a system component. The first processor instructs an available second processor to perform part of the command. The second processor constructs, based on the instruction, a hardware accelerator command and executes the hardware accelerator command using a hardware accelerator. The second processor then provides a result from the hardware accelerator to the first processor.

In some implementations, each second processor is configured to communicate with a respective hardware accelerator. The first processor may identify the hardware accelerator associated with the part of the command to be performed by the second processor. The first processor then transmits the instruction to a respective second processor that is configured to communicate with the identified hardware accelerator. Such communication between processors may, in some implementations, be enabled by an inter-processor switch. The first processor may generate an inter-processor packet for communication with the second processor and transmit the inter-processor pack to the inter-processor switch. Similarly, each second processor may generate an inter-processor packet for communication with the first processor and transmit the inter-processor packet to the inter-processor switch.

In some implementations, the first processor includes a launcher that s configured to receive an inter-processor packet, and a core that is configured to receive a command based on the inter-processor packet.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which:

FIG. 12 is a flowchart representing an illustrative process for executing a command received at a first processor by a second processor using a hardware accelerator, in accordance with some implementations of the disclosure.

DETAILED DESCRIPTION

Figure 1:
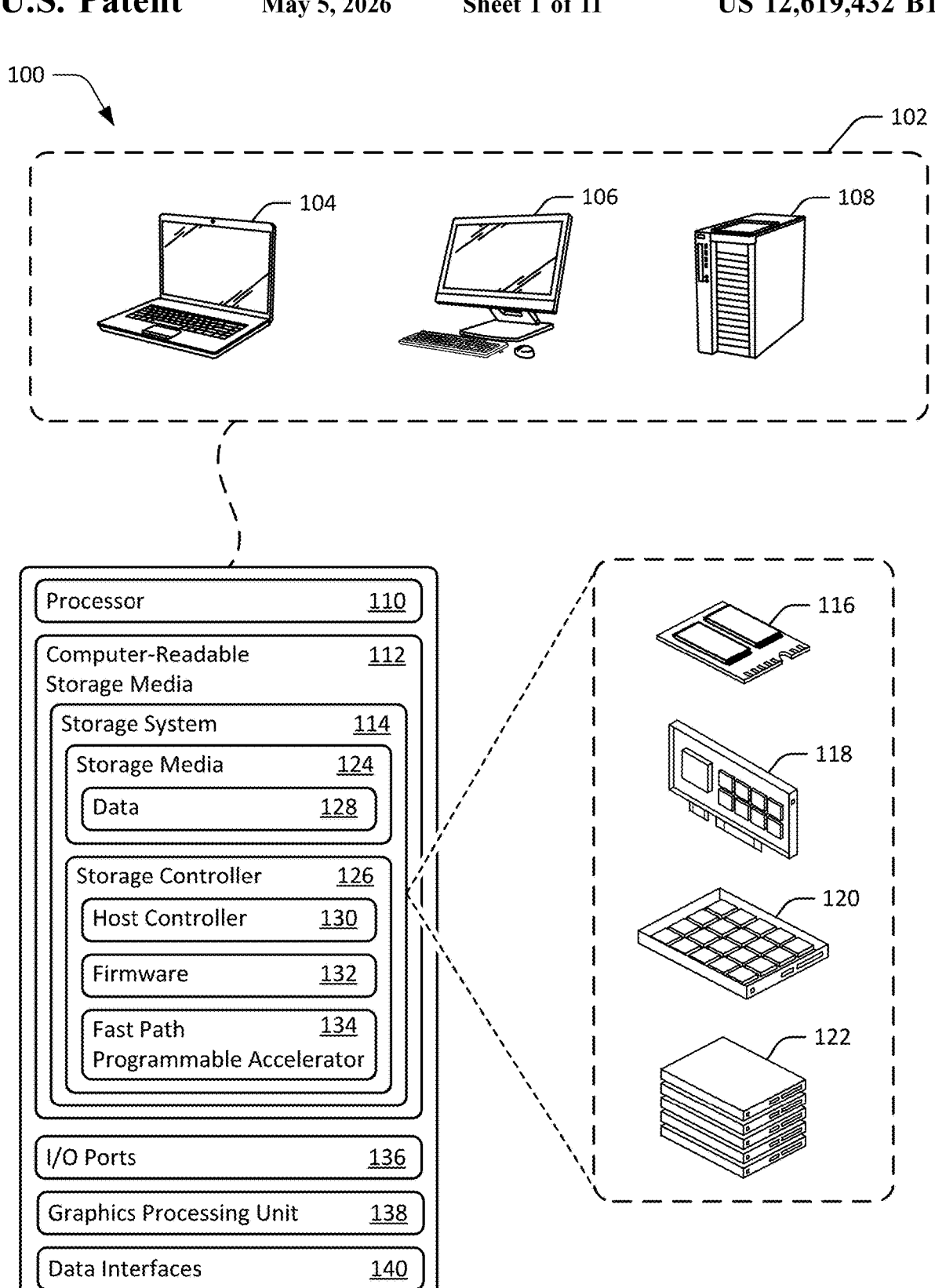
FIG. 1 illustrates an example operating environment having systems in which a FPA architecture with configurable grouping of processor elements is implemented, in accordance with some implementations of the disclosure.

FIG. 1 illustrates an example operating environment 100 having a host system 102, capable of storing or accessing various forms of data or information. Examples of a host system 102 may include a laptop computer 104, desktop computer 106, and server 108, any of which may be configured as user device, computing device, or as part of a storage network, data storage center, cloud storage, or the like. Further examples of host system 102 (not shown) may include a tablet computer, a set-top-box, a data storage appliance, wearable smart-device, television, content-streaming device, high-definition multimedia interface (HDMI) media stick, smart appliance, home automation controller, smart thermostat, Internet-of-Things (IoT) device, mobile-internet device (MID), a network-attached-storage (NAS) drive, aggregate storage system, gaming console, automotive entertainment device, automotive computing system, automotive control module (e.g., engine or power train control module), and so on. Generally, the host system 102 may communicate or store data for any suitable purpose, such as to enable functionalities of a particular type of device, provide a user interface, enable network access, implement gaming applications, playback media, provide navigation, edit content, provide data storage, or the like.

The host system 102 includes a processor 110 and computer-readable media 112. The processor 110 may be implemented as any suitable type or number of processors, either single-core or multi-core, for executing instructions or commands of an operating system or other applications of the host system 102. In some implementations, the processors 110 of a host system may execute tenants, services, or workloads of a data storage system or data storage center. The computer-readable media 112 (CRM 112) includes memory (not shown) and a storage system 114 of the host system 102. The memory of the host system 102 may include any suitable type or combination of volatile memory or nonvolatile memory. For example, the volatile memory of host system 102 may include various types of random-access memory (RAM), dynamic RAM (DRAM), static RAM (SRAM) or the like. The non-volatile memory may include read-only memory (ROM), electronically erasable programmable ROM (EEPROM), solid-state storage media, or Flash memory.

The storage system 114 of the host system 102 may be configured as any suitable type of data storage system, such as a data storage center, storage device, storage drive, storage array, storage volume, or the like. Although described with reference to the host system 102, the storage system 114 may also be implemented separately as a stand-alone device or as part of a larger storage collective, such as a network-attached storage device, external storage drive, data storage center, server farm, or virtualized storage system (e.g., for cloud-based storage or services). Examples of the storage system 114 include a non-volatile memory express (NVMe) solid-state drive 116, a peripheral component interconnect express (PCIe) solid-state drive 118, a solid-state drive 120 (SSD 120), and a storage array 122, which may be implemented with any combination of storage devices or storage drives.

The storage system 114 includes storage media 124 and a storage media controller 126 (storage controller 126) for managing various operations or functionalities of the storage system 114. The storage media 124 may include or be formed from non-volatile memory devices on which data 128 or information of the host system 102 is stored. The storage media 124 may be implemented with any type or combination of solid-state memory media, such as Flash, NAND Flash, RAM, DRAM (e.g., for caching), SRAM, or the like. For example, the storage media 124 of the storage system 114 may include NAND Flash memory, single-level cell (SLC) Flash memory, multi-level cell (MLC) Flash memory, triple-level cell (TLC) Flash, quad-level cell Flash (QLC), NOR cell Flash, or any combination thereof. These memories, individually or in combination, may store data associated with a user, applications, tenant, workload, service, and/or an operating system of host system 102.

Generally, the storage controller 126 manages operation of the storage system 114 and enables the host system 102 to access the storage media 124 for data storage. The storage controller 126 may be implemented through any suitable combination of hardware, firmware, or software to provide various functionalities of the storage system 114. The storage controller 126 may also manage or administrate internal tasks or operations associated with the storage media 124, which may include data placement, data-to-block mapping, data caching, data migration, garbage collection, thermal management (e.g., throttling), power management, or the like. As such, the storage controller 126 may receive host I/Os from the host system 102 for data access and queue (or generate) internal I/Os associated with internal operations for the storage media 124. Generally, the storage controller 126 may perform media I/Os for access of the storage media 124 that correspond to scheduled host I/Os for data access (e.g., host write requests or read requests) and/or internal I/Os for internal operations or tasks associated with the storage media 124.

In this example, storage controller 126 also includes a host controller (HCT) 130, firmware 132 of the storage controller, and fast path programmable accelerator (FPA) 134. In other configurations, the storage controller 126 may have access to a fast path programmable accelerator 134 or component thereof. In various aspects, the host controller 130 or firmware 132 may use the fast path programmable accelerator 134 as described herein, which may enable various configurations of pipeline stages for processing I/O commands or data access provided by the storage controller.

Returning to FIG. 1, the host system 102 may also include I/O ports 136, a graphics processing unit 138 (GPU 138), and data interfaces 140. Generally, the I/O ports 136 allow a host system 102 to interact with other devices, peripherals, or users. For example, the I/O ports 136 may include or be coupled with a universal serial bus, human interface devices, audio inputs, audio outputs, or the like. The GPU 138 processes and renders graphics-related data for host system 102, such as user interface elements of an operating system, applications, or the like. In some cases, the GPU 138 accesses a portion of local memory to render graphics or includes dedicated memory for rendering graphics (e.g., video RAM) of the host system 102.

The data interfaces 140 of the host system 102 provide connectivity to one or more networks and other devices connected to those networks. The data interfaces 140 may include wired interfaces, such as Ethernet or fiber optic interfaces for communicated over a local network, intranet, or the Internet. Alternately or additionally, the data interfaces 140 may include wireless interfaces that facilitate communication over wireless networks, such as wireless LANs, wide-area wireless networks (e.g., cellular networks), and/or wireless personal-area-networks (WPANs). Any of the data communicated through the I/O ports 136 or the data interfaces 140 may be written to or read from the storage system 114 of the host system 102 in accordance with one or more aspects of FPA-enabled processing of storage media commands.

Figure 2:
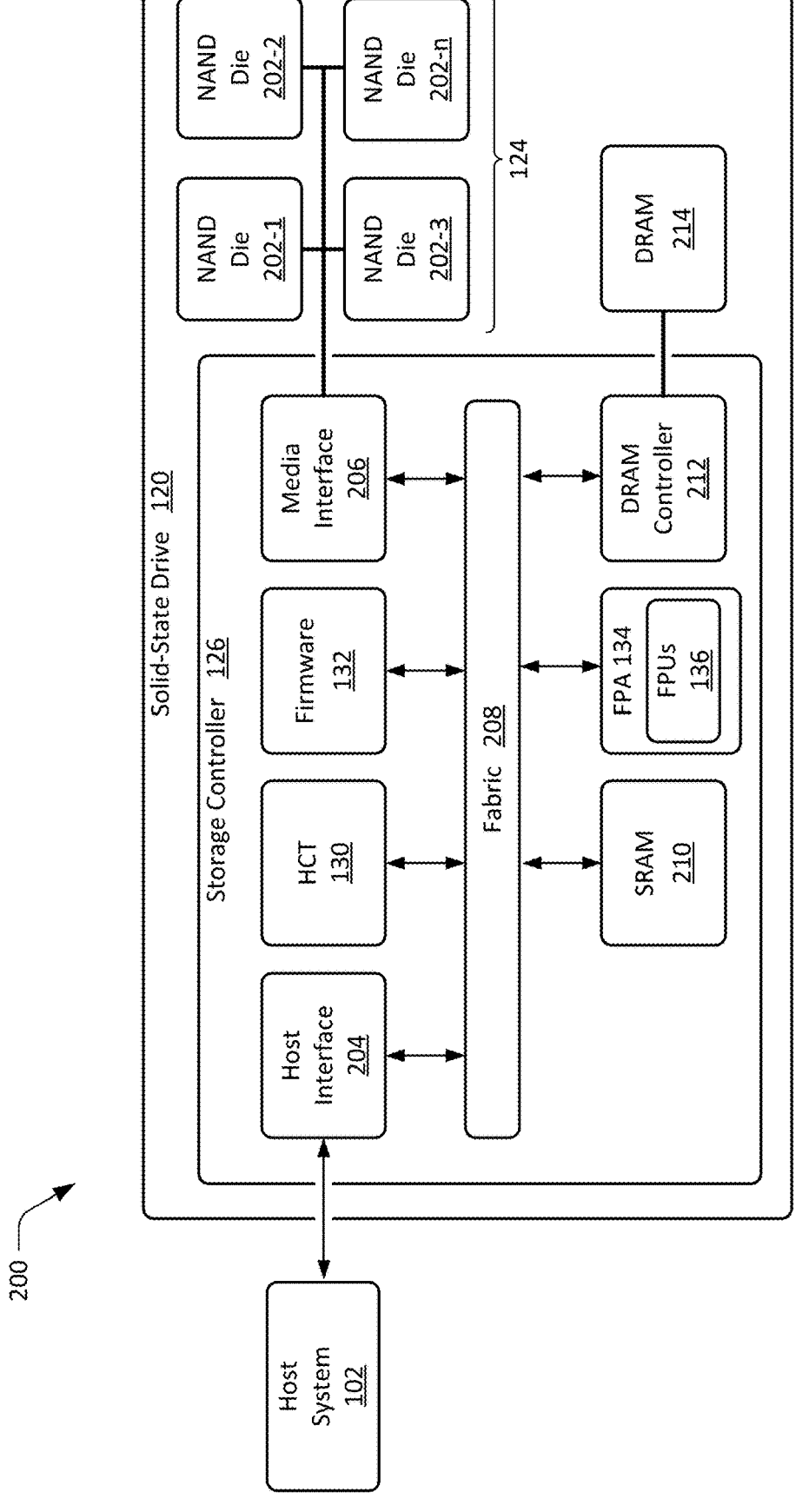
FIG. 2 illustrates an example configuration of storage system components that may implement aspects of a FPA architecture with configurable grouping of processor elements, in accordance with some implementations of the disclosure.

FIG. 2 illustrates at 200 an example configuration of a solid-state drive 202 and the FPA 134 of the storage controller 126 of FIG. 1. The FPA 132 may interact with the host system 102 and/or entities of the storage controller 126 to implement aspects of FPA-enabled processing of storage media commands. In aspects, FPA 134 can be implemented with multiple instances of fast path processing units, which may be configured as general (e.g., configurable) fast path processing units or task specific fast path processing units, examples of which are described throughout this disclosure. In this example, the storage controller 126 of the SSD 120 includes the FPA 134 and FPUs 136, which may be selectively configured to provide a staged or pipelined processing system of multiple stage that each include one or more FPUs 136. In some cases, additional SSDs, storage controllers, or storage aggregators (not shown) of a storage system may be configured similar to SSD 120 with respective instances of onboard FPAs 134, which may be configured similar to or different from one another. In aspects, the HCT 130 and/or firmware 132 of the storage controller 126 may communicate with the FPA 134 to exchange information, which may include various configuration parameters, reconfiguration parameters, performance targets (e.g., pipeline stage throughput, bandwidth, latency, or the like), command transfers, metrics for read/write content of workloads, or metrics of storage media access, examples of which are described herein.

In this example, the FPA 134 is illustrated in the context of a storage system 114 that is implemented as a solid-state storage drive (SSD) 120. The SSD 120 may be coupled to any suitable host system 102 and implemented with storage media 124 that includes multiple NAND Flash dies 202-1 through 202-n, where n is any suitable integer. In some cases, the NAND dies 202 form a NAND device that includes multiple Flash channels of memory devices, dies, or chips that may be accessible or managed on a channel-level (group of dies), device-level (individual dies), or block-level (individual blocks or pages of storage media cells). Although illustrated as components of the SSD 120, the FPA 134 and/or FPUs may be implemented separately from or external to a storage system 114. In some cases, the FPA 134 or FPUs 136 are implemented as part of a storage media accelerator or aggregate storage controller coupled between a host system 102 and one or more storage systems 114.

Generally, operations of the SSD 120 are enabled or managed by an instance of the storage controller 126, which in this example includes a host interface 204 to enable communication with the host system 102 and a media interface 206 to enable access to the storage media 124. The host interface 204 may be configured to implement any suitable type of storage interface or protocol, such as serial advanced technology attachment (SATA), universal serial bus (USB), PCIe, advanced host controller interface (AHCI), NVMe, NVM-over Fabric (NVM-OF), NVM host controller interface specification (NVMHCIS), small computer system interface (SCSI), serial attached SCSI (SAS), secure digital I/O (SDIO), Fibre channel, any combination thereof (e.g., an M.2 or next generation form-factor (NGFF) combined interface), or the like. Alternately or additionally, the media interface 204 may implement any suitable type of storage media interface, such as a Flash interface, Flash bus channel interface, NAND channel interface, physical page addressing (PPA) interface, or the like.

In various aspects, components of the SSD 120 or storage controller 126 provide a data path between the host interface 204 to the host system 102 and the media interface 206 to the storage media 124. In this example, the storage controller 126 includes one or more processor cores (not shown) for executing a kernel, firmware 132, and/or a driver to implement various functions of the storage controller 126. In some cases, the processor cores may include the FPUs 136 that execute processor-executable instructions (e.g., microcode) to implement the FPA 134 or pipelined stages thereof. Alternately or additionally, the FPA 134 or other components of the storage controller 126 may execute from or run on function-specific hardware, machine learning (ML) module, artificial intelligence (AI) engines, or task-specific processor cores.

As shown in FIG. 2, a fabric 208 of the storage controller 126, which may include control and data buses, operably couples and enables communication between the components of the storage controller 126. For example, the FPA 134 or FPUs 136 may communicate with the HCT 130, firmware 132, host interface 204, processor cores (e.g., firmware), or media interface 206 to exchange data, information, or command I/Os within the storage controller 126. In aspects, the HCT 130 and/or firmware 132 may offload commands or tasks to the FPA 134, such as data processing, data encryption, and data protection/correction, and so forth that are available and can be carried out during the data transfer between the host and system memory (e.g., SoC memory and/or storage). A static random-access memory 210 (SRAM 210) of the storage controller 126 may store processor-executable instructions or code for firmware or drivers of the storage controller, which may be executed by the processor cores, FPUs 136, or other processors or controllers of the storage controller. The storage controller 126 may also include a dynamic random-access memory (DRAM) controller 212 and associated a DRAM 214 for storage or caching various data as the storage controller 126 moves and processes data between the host system 102, storage media 124, or other components of the storage controller.

Figure 3:
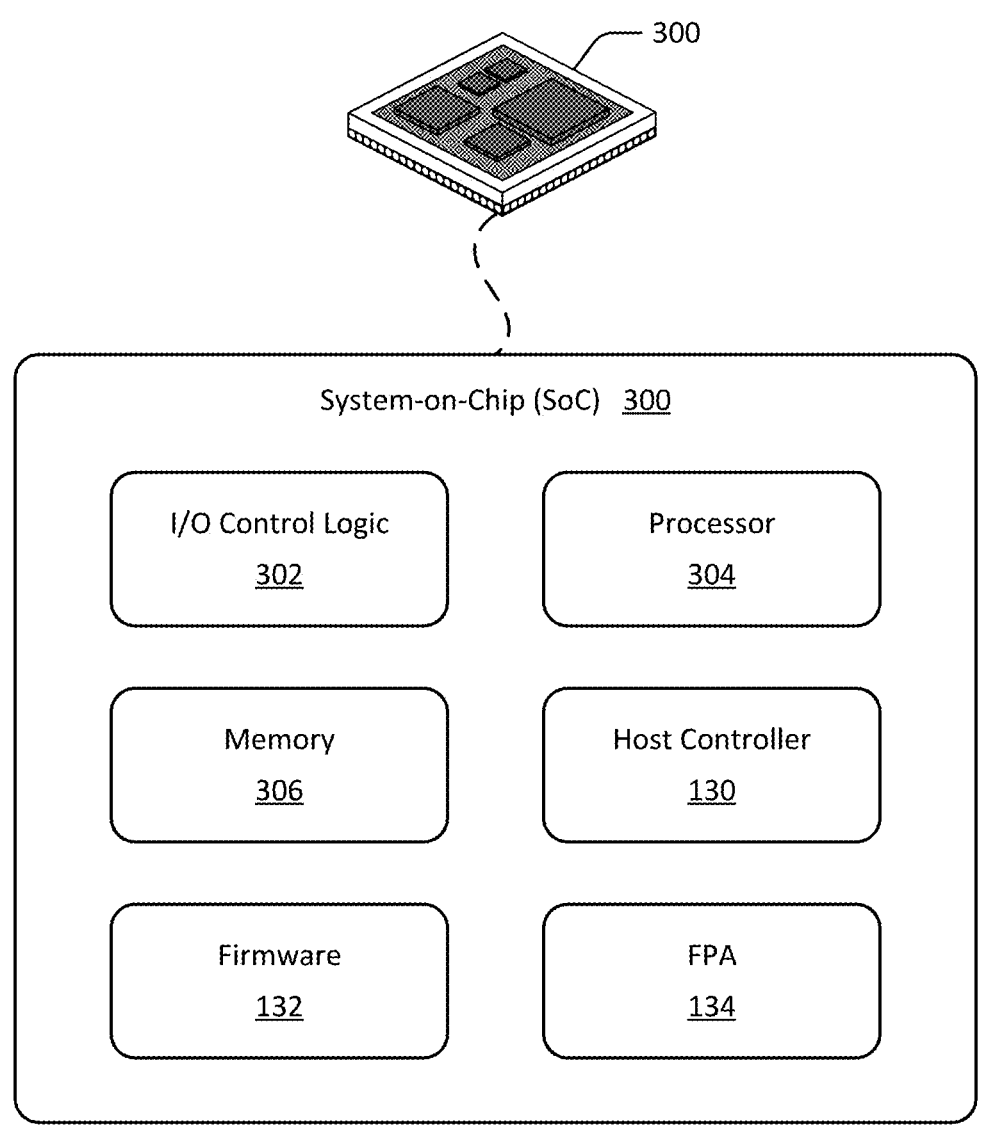
FIG. 3 illustrates an example System-on-Chip (SoC) environment in which aspects of a FPA architecture with configurable grouping of processor elements may be implemented, in accordance with some implementations of the disclosure.

FIG. 3 illustrates an example System-on-Chip (SoC) 300 environment in which various aspects of FPA-enabled processing of storage media commands may be implemented. The SoC 300 may be implemented in any suitable system or device, such as a smart-phone, netbook, tablet computer, access point, network-attached storage, camera, smart appliance, printer, set-top box, server, data storage center, solid-state drive (SSD), hard disk drive (HDD), storage drive array, memory module, automotive computing system, aggregate storage controller, or any other suitable type of device (e.g., others described herein). Although described with reference to a SoC, the entities of FIG. 3 may also be implemented as other types of integrated circuits or embedded systems, such as an application-specific integrated-circuit (ASIC), memory controller, storage controller, communication controller, application-specific standard product (ASSP), digital signal processor (DSP), programmable SoC (PsoC), system-in-package (SiP), or field-programmable gate array (FPGA).

The SoC 300 may be integrated with electronic circuitry, a microprocessor, memory, input-output (I/O) control logic, communication interfaces, firmware, and/or software useful to provide functionalities of a computing device, host system, or storage system, such as any of the devices or components described herein (e.g., storage drive or storage array). The SoC 300 may also include an integrated data bus or interconnect fabric (not shown) that couples the various components of the SoC for control signaling, data communication, and/or routing between the components. The integrated data bus, interconnect fabric, or other components of the SoC 300 may be exposed or accessed through an external port, parallel data interface, serial data interface, fabric-based interface, peripheral component interface, or any other suitable data interface. For example, the components of the SoC 300 may access or control external storage media, magnetic disk media, ML controllers, neural networks, datasets, or AI models, through an external interface or off-chip data interface.

In this example, the SoC 300 includes various components such as input-output (I/O) control logic 302 and a hardware-based processor 304 (processor 304), such as a microprocessor, processor core, application processor, DSP, or the like. The SoC 300 also includes memory 306, which may include any type and/or combination of RAM, SRAM, DRAM, non-volatile memory, ROM, one-time programmable (OTP) memory, multiple-time programmable (MTP) memory, Flash memory, and/or other suitable electronic data storage. In some aspects, the processor 304 and code stored on the memory 306 are implemented as a storage system controller or storage aggregator to provide various functionalities associated with FPA-enabled processing of storage media commands. In the context of this disclosure, the memory 306 stores data, code, instructions, or other information via non-transitory signals, and does not include carrier waves or transitory signals. Alternately or additionally, SoC 300 may comprise a data interface (not shown) for accessing additional or expandable off-chip storage media, such as solid-state memory (e.g., Flash or NAND memory), magnetic-based memory media, or optical-based memory media.

The SoC 300 may also include firmware 132, applications, programs, software, and/or operating system, which may be embodied as processor-executable instructions maintained on the memory 306 for execution by the processor 304 to implement functionalities of the SoC 300. The SoC 300 may also include other communication interfaces, such as a transceiver interface for controlling or communicating with components of a local on-chip (not shown) or off-chip communication transceiver. Alternately or additionally, the transceiver interface may also include or implement a signal interface to communicate radio frequency (RF), intermediate frequency (IF), or baseband frequency signals off-chip to facilitate wired or wireless communication through transceivers, physical layer transceivers (PHYs), or media access controllers (MACs) coupled to the SoC 300. For example, the SoC 300 may include a transceiver interface configured to enable storage over a wired or wireless network, such as to provide a network attached storage (NAS) volume with FPA-enabled processing of storage media commands.

The SoC 300 also includes a host controller 130 and a FPA 134, which may be implemented with one or more configurable FPUs 136 (not shown) as described herein to implement groups of FPUs to form a stage pipeline for processing data or other commands. In accordance with various aspects of FPA-enabled processing of storage media commands, the FPA 134 may interact with the firmware 132 and host controller 130, which may offload or assign commands or data to the FPA 134 for processing. Any of these entities may be embodied as disparate or combined components, as described with reference to various aspects presented herein. Examples of these components and/or entities, or corresponding functionality, are described with reference to the respective components or entities of the environment 100 of FIG. 1 or respective configurations illustrated in FIGS. 2-4, and/or throughout this disclosure. The FPA 134, either in whole or part, may be implemented as FPUs configured to execute processor-executable instructions (e.g., microcode) maintained by the memory 306 and executed by the processor 304 and/or FPUs 136 to implement various aspects and/or features of FPA-enabled processing of storage media commands or data. The FPA 134, may be implemented independently or in combination with any suitable component or circuitry to implement aspects described herein. For example, the FPA 134 and/or FPUs 136 may be implemented as part of a DSP, processor/storage bridge, I/O bridge, graphics processing unit, memory controller, storage controller, arithmetic logic unit (ALU), or the like. The FPA 134 may also be provided integral with other entities of SoC 300, such as integrated with the processor 304, memory 306, a storage media interface, or firmware 308 of the SoC 300. Alternately or additionally, the FPA 134, FPUs 135, hardware accelerators, communication hub, and/or other components of the SoC 300 may be implemented as hardware, firmware, fixed logic circuitry, or any combination thereof.

Figure 4:
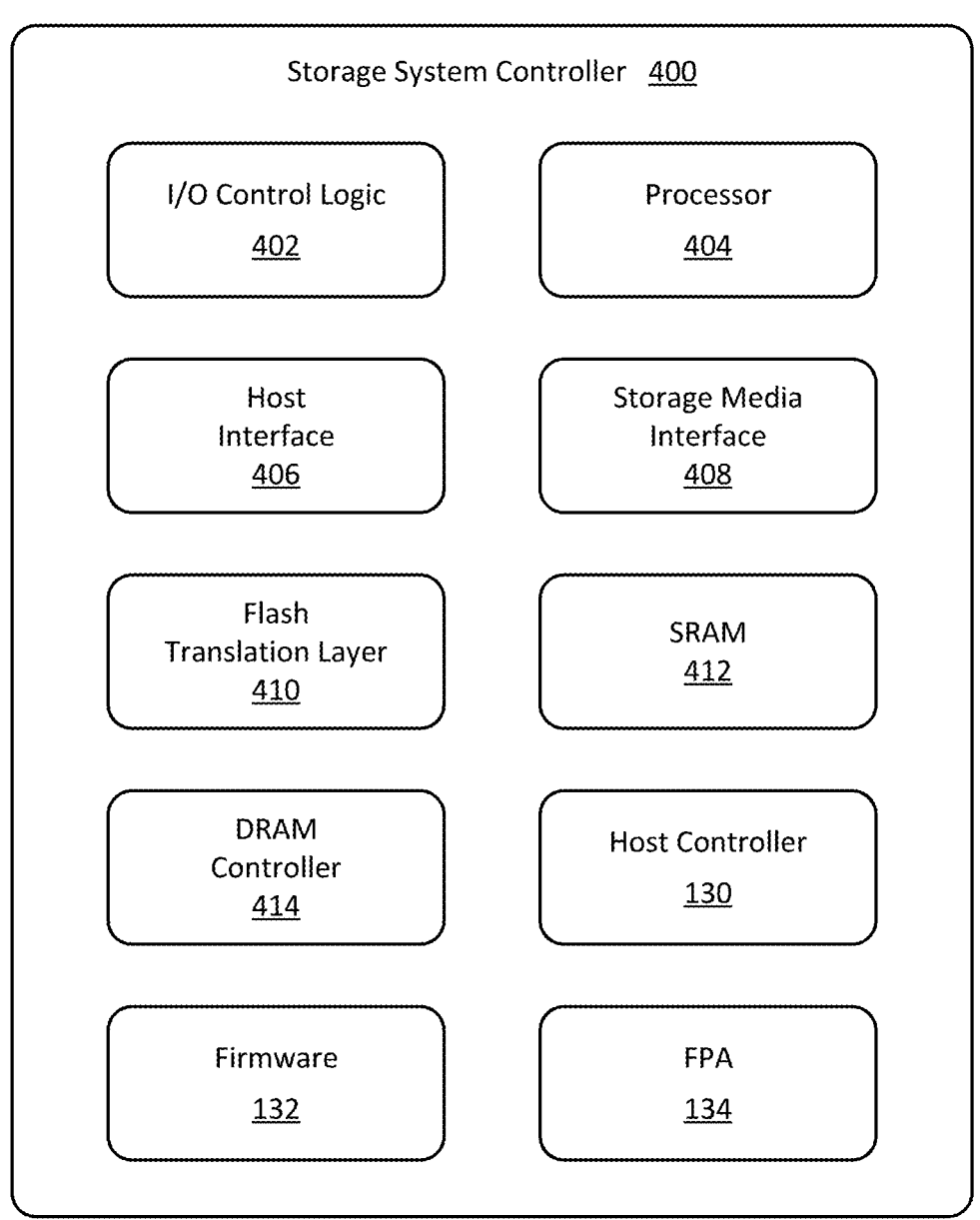
FIG. 4 illustrates an example storage system controller in which a FPA architecture with configurable grouping of processor elements is implemented, in accordance with some implementations of the disclosure.

FIG. 4 which illustrates another example storage system controller 400 in accordance with one or more aspects of FPA-enabled processing of storage media commands and/or data. In various aspects, the storage system controller 400 or any combination of components thereof may be implemented as a storage drive controller, distributed storage center controller (e.g., among a host and SSDs), storage media controller, NAS controller, Fabric interface, NVMe target, or storage aggregation controller for solid-state storage media. In some cases, the storage system controller 400 is implemented similar to or with components of the SoC 300 as described with reference to FIG. 3. In other words, an instance of the SoC 300 may be configured as a storage system controller, such as the storage system controller 400 to manage solid-state (e.g., NAND Flash-based) media with machine learning for optimized data placement and access.

As shown in FIG. 4, the storage system controller 400 includes input-output (I/O) control logic 402 and a processor 404, such as a microprocessor, processor core, application processor, DSP, or the like. In some aspects, the processor 404 and firmware of the storage system controller 400 may be implemented to provide various functionalities associated with FPA-enabled processing of storage media commands, such as any of those described in this disclosure. The storage system controller 400 also includes a host interface 406 (e.g., SATA, PCIe, NVMe, or Fabric interface) and a storage media interface 408 (e.g., NAND interface), which enable access to a host system and storage media, respectively. The storage system controller 400 also includes a Flash translation layer 410 (FTL 410), SRAM 412, and DRAM controller 414. In some aspects of FPA-enabled processing of storage media commands, the FTL 410 interacts with a FPA 134 and/or FPUs 136 to process commands, tasks, or other data, which may be offloaded to the FPA 134 by the firmware 132 or host controller 130.

In this example, the storage system controller 400 also includes instances of the host controller 130, firmware 132 of the controller, and an FPA 134 (FPUs 136 not shown). Any or all of these components may be implemented separately as shown or combined with the processor 404, host interface 406, storage media interface 408, Flash translation layer 410, SRAM 412, and/or DRAM controller 414, or as described throughout this disclosure. Examples of these components and/or entities, or corresponding functionality, are described with reference to the respective components or entities of the environment 100 of FIG. 1 or respective configurations illustrated in FIGS. 2 and 3, and throughout the disclosure. In accordance with various aspects of FPA-enabled processing of storage media data or commands, the FPA 134 may interact with the host controller 130 or firmware 132 to receive configuration parameters, reconfiguration parameters, data, commands, or other tasks for processing. Alternately or additionally, the FPUs 136 of the FPA 134 may be grouped and/or configured as described throughout this disclosure to implement one or more staged pipelines for processing commands or data associated with enable storage media access, management, or internal tasks of the storage controller 400. The FPA 134, either in whole or part, may be implemented as FPUs 136 or other processing units configured to execute processor-executable instructions (e.g., microcode) maintained by memory of the controller or other entities of the controller to implement various aspects and/or features of FPA-enabled processing of storage media commands, data, or tasks.

The Fast Path Programmable Accelerator may be implemented by a storage controller that includes a host controller, storage controller firmware (firmware), and a storage interface to storage media. These various storage controller modules or functions may be implemented through any suitable combination of IP blocks, firmware, and/or associated hardware. Generally, the host controller (HCT) or NVMe IP is a hardware module that assists the firmware to control and initiate Host activities, e.g., with a host system or host device. The HCT may be implemented based on the NVMe Specification. Many complicated operations, such as data encryption and data protection/correction, are available and can be carried out during the data transfer between the host and system memory (e.g., SoC memory and/or storage). The HCT also comes with many adjustable built-in QoS (Quality of Service) algorithms which can be used to achieve different performance profiles targets. This disclosure describes various HCT components (e.g., hardware, firmware, and/or software) and describes functionalities enabled by the HCT. Generally, the disclosure organizes information related to the HCT and FPA framework based on the several aspects, including operation flow, interaction, feature and concept, and flow control.

Operation flow refers to the general operation flows of the hardware and associated framework. It provides a summary of hardware behavior when Admin, Read, and/or Program operations are initiated.

Interaction relates to how the hardware interacts with firmware and/or other hardware modules. It may include the interfaces and/or data structures used by an internal algorithm implemented by the HCT and/or FPA framework. An interaction may involve a master and a slave. In aspects, the master is the entity that requests for a service (i.e., issues request) or sets up the configurations, and the slave is the entity that provides the service (i.e., executes and completes the request) and adopts the configurations. Because a service is provided by the Slave, the Slave may be responsible for describing the service (i.e., interaction). Therefore, the interaction section of the internal modules may describe the interaction method(s) related to its Slave interface(s) without corresponding description of the master side, except the top-level module. This disclosure may describe the interaction method related to the master interface of the top level module because the Slave is outside of the scope of this disclosure.

Feature and concept describes the basis and operation concepts of the hardware and associated framework. It also introduces the hardware features and associated constraints of which the firmware may be aware.

Flow control describes the QoS algorithm/logic of the hardware. Some of algorithms/logic may be fixed, while most of them are configurable by the host, HCT, or other entities described herein.

Generally, when the host transport protocol becomes more complicated and the performance requirement becomes higher, firmware of a controller becomes the bottle neck of the system. Conventional solutions, such as increasing the number of CPUs, can heavily increase the area and power consumption, as well as lead to other inefficiencies associated with fixed, suboptimal hardware designs.

In contrast with preceding solutions, the Fast Path Programable Accelerator (FPA) and associated framework is designed to offload the workload from the firmware (main CPU) regarding to processing and analyzing the host command, such that the targeted performance can be achieved. In aspects, the FPA is a Micro Code driven hardware accelerator, which contains multiple small processors, which may be selectively grouped and/or configured depending on workload or target performance metrics. The processors of the accelerator may be specialized for data manipulations and checking. They can also perform basic mathematic operations. In aspects, the processors can be selectively grouped (e.g., based on expected workload, bandwidth, or latency targets) and managed in a pipeline fashion to satisfy the required throughput. With an associated internal switch, specially designed and/or configured to support the FPA, the FPA may ensure the efficiency of internal inter-processor communication. In aspects, the FPA communicates and drives the major hardware accelerators through dedicated local interfaces. The FPA may also access the system memory through its Advanced Extensible Interface (AXI) ports and communicate with the main CPU through one of the attached hardware accelerators. This section describes the detail of the FPA design.

Figure 5:
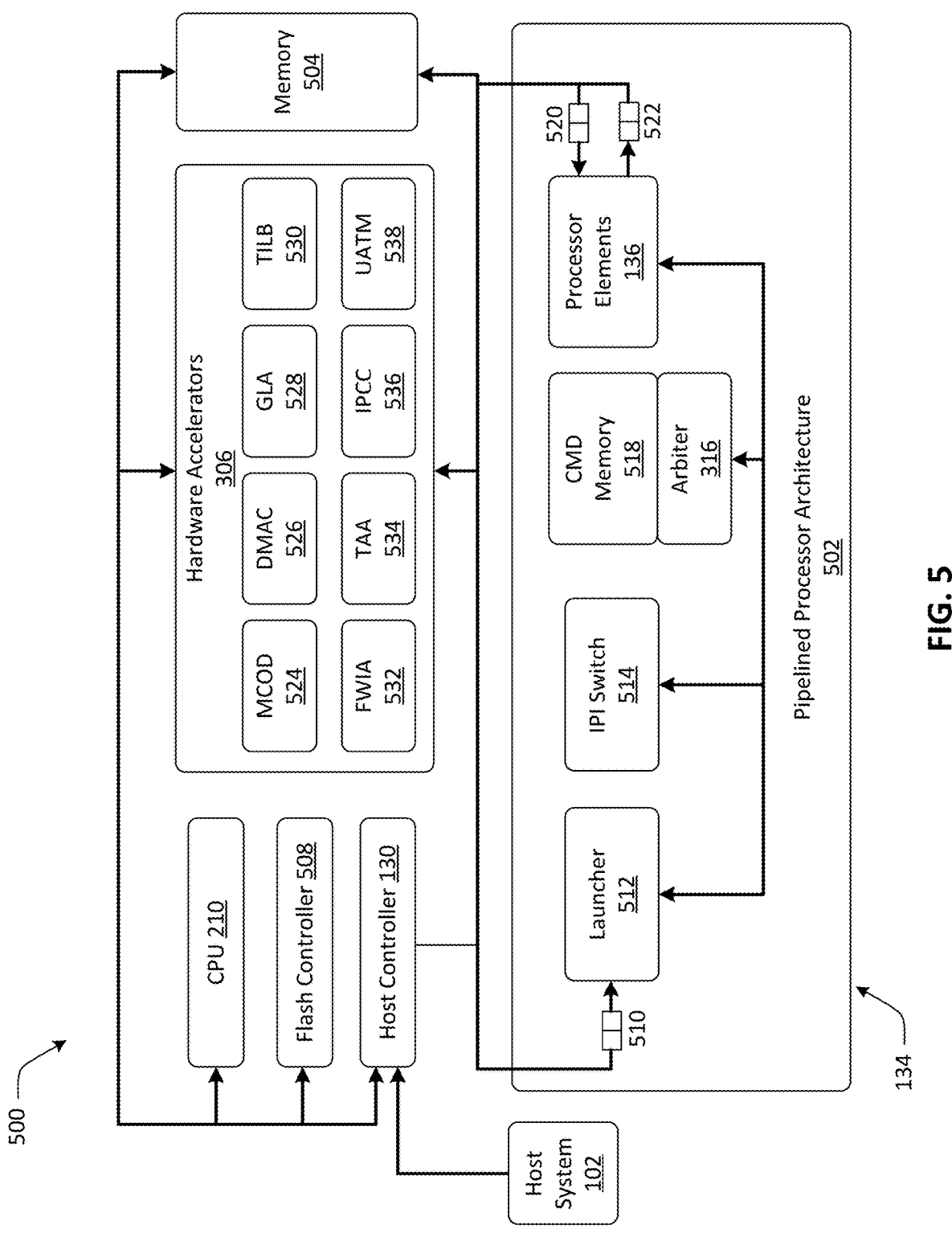
FIG. 5 illustrates an example configuration of a FPA architecture with configurable grouping of processor elements, in accordance with some implementations of the disclosure.

FIG. 5 illustrates at 500 an example configuration of an example configuration of an FPA architecture 502 with configurable grouping of processor elements. In aspects, the FPA architecture 502 may represent the FPA 134 of the storage controller 126 described herein. In some cases, the FPA architecture 502, memory 504 (e.g., system memory), and hardware accelerators 506 are implemented as a command automation controller (CAC), which may participate in the processing of commands received from the host system 102. Based on configurations of firmware of a storage controller or respective components shown, the FPA architecture 502 may be involved in processing commands and/or data in various ways, some examples of which are described with reference to FIG. 5 and throughout this disclosure.

As shown in FIG. 5, the FPA architecture 502 may be operably coupled with a memory 504, hardware accelerators 506, a CPU 210, a Flash controller 508, and host controller 130, which may be implemented as components of a storage controller. The CPU 210 may execute firmware 132 (not shown) to implement functionalities of the storage controller, such as coordinating transactions between the host controller 130, Flash controller 508, and FPA architecture 502 to move or process data as requested by commands (e.g., host commands) received from the host system 102. In some implementations, a system bus or local interfaces (e.g., an AXI interconnect or fabric) operably couple the host controller 130, CPU 210, hardware accelerators 506, Flash controller 508, and memory 504 to enable the exchange of commands, information, or the like. The FPA architecture 502 may also include interfaces (e.g., processor element interfaces) for communicating any suitable commands, status indicators, data, or the like with the host controller 130, the memory 504, hardware accelerators 506.

In aspects, the FPA architecture 502 includes a command submission first-in, first-out (FIFO) buffer (CSF) 510, which may receive commands from the host controller 130. In this example, the FPA architecture 502 also includes a processor launcher 512, an inter-processor interaction (IPI) switch 514, an arbiter 516, and a command memory 518 that are coupled to the processor elements 136. The CSF 510 buffer may receive commands from the host controller 130 for processing by components of the FPA architecture 502 and the launcher 512 can store the commands to the command memory 518 or initiate action by other components of the architecture. Generally, the IPI switch 514 or an inter-processor communication controller manages routing of packets or data between various components of the pipeline processor architecture. The command memory 518 can store commands for processing and the arbiter 516 of the FPA can arbitrate between commands to select a command for processing by the processor elements 136. In some implementations, the processor elements 136 are coupled to external accelerator and/or external memory input buffer 520 and output buffer 522, which enable communication with the memory 504 or hardware accelerators 506. The hardware accelerators 506 may include any suitable type of module or accelerator, and in this example include a media command overlap detector (MCOD) 524, a direct memory access controller (DMAC) 526, a general lookup accelerator (GLA) 328, transfer information linked builder (TILB) 330, a firmware interaction accelerator (FWIA) 332, a table access accelerator (TAA) 334, an inter-processor communication controller (IPCC) 336, and a universal address translation module (UATM) 338.

In aspects, the FPA architecture 502 and components of the storage controller implement a general workflow for processing commands or data to provide functionalities of a media storage system. For example, the host controller 130 can fetch a command from the host system 102 based on detection of a doorbell event by the host controller 130. The host controller 130 or the firmware 132 may then assign the command a command index (e.g., a unique command index, not shown), which enables tracking of the command or associated data throughout the storage controller. The host controller 130 can then deliver the command and associated command index to the FPA architecture 502 through the CSF 510 of the FPA 134.

After receiving the command from the CSF 510, the launcher 312 may store the command to the command memory 518 in accordance with the command according to the command index of the command. In aspects, the launcher 512 initiates or triggers a group or stage of the processor elements 136 (e.g., one or more processor elements) to process the command of the host based on respective register configurations of processor elements 136. As described herein, the processor elements 136 (or processing units) of the FPA 134 may process host commands according to microcode (e.g., processor-executable instructions) loaded into instruction memory of the processor element and/or command information loaded in a command memory of the processor element. In some cases, the processor element 136 processing the command uses one or more of the hardware accelerators 506 to accomplish its tasks for processing the command or associated data. Alternatively or additionally, the processor element 136 can access the memory 504, which may be configured as system memory for the storage controller. Generally, the processor element 136 can be configured to perform any suitable task for processing commands received from the host system 102, which may include command validation, command overlapping check, host logical block address (LBA) mapping/information lookup, and so forth. After completing the processing tasks for which the processor element is configured, the processor element can forward the command to the CPU 210 or firmware 132 through the IPCC 536 of the hardware accelerators 506.

In some aspects, the firmware 132 assumed control over processing the command after receiving command information (e.g., intermediate results of command processing) from the processor element 136 through the IPCC 536. The firmware 132, executing on the CPU 210, can program data transfer related configurations for the command in the host controller 130 HCT and then trigger the host controller 130 to transfer the data of the command from the host system 102 to the memory 504 (e.g., perform command activation). In some cases, the firmware 132 skips command activation when one of the processor elements 136 of the FPA 134 performs these operations beforehand.

With respect to post-processing of the command after completion of the data transfer, the firmware 132 may manage post-processing tasks, such as cleaning up and freeing resources allocated for processing the host command. In other cases, the host controller 130 can send an indication or notification directly to one or more of the processor elements 136 to delegate post-processing activities after the data transfer completes. For example, the processor element(s) 136 can implement the post-processing activities according to the microcode loaded into the instruction memory of the processor element and/or command information stored in the command memory of the processor element. Alternatively or additionally, the processor element 136 can use one or more of the hardware accelerators 506 to perform these post-processing tasks, or access memory 504 to do so. After the processor element 136 completes the post-processing of the command, the post-processing task is considered complete and the processor element may notify the host controller 130 or firmware 132 of the completion via status registers.

Figure 6:
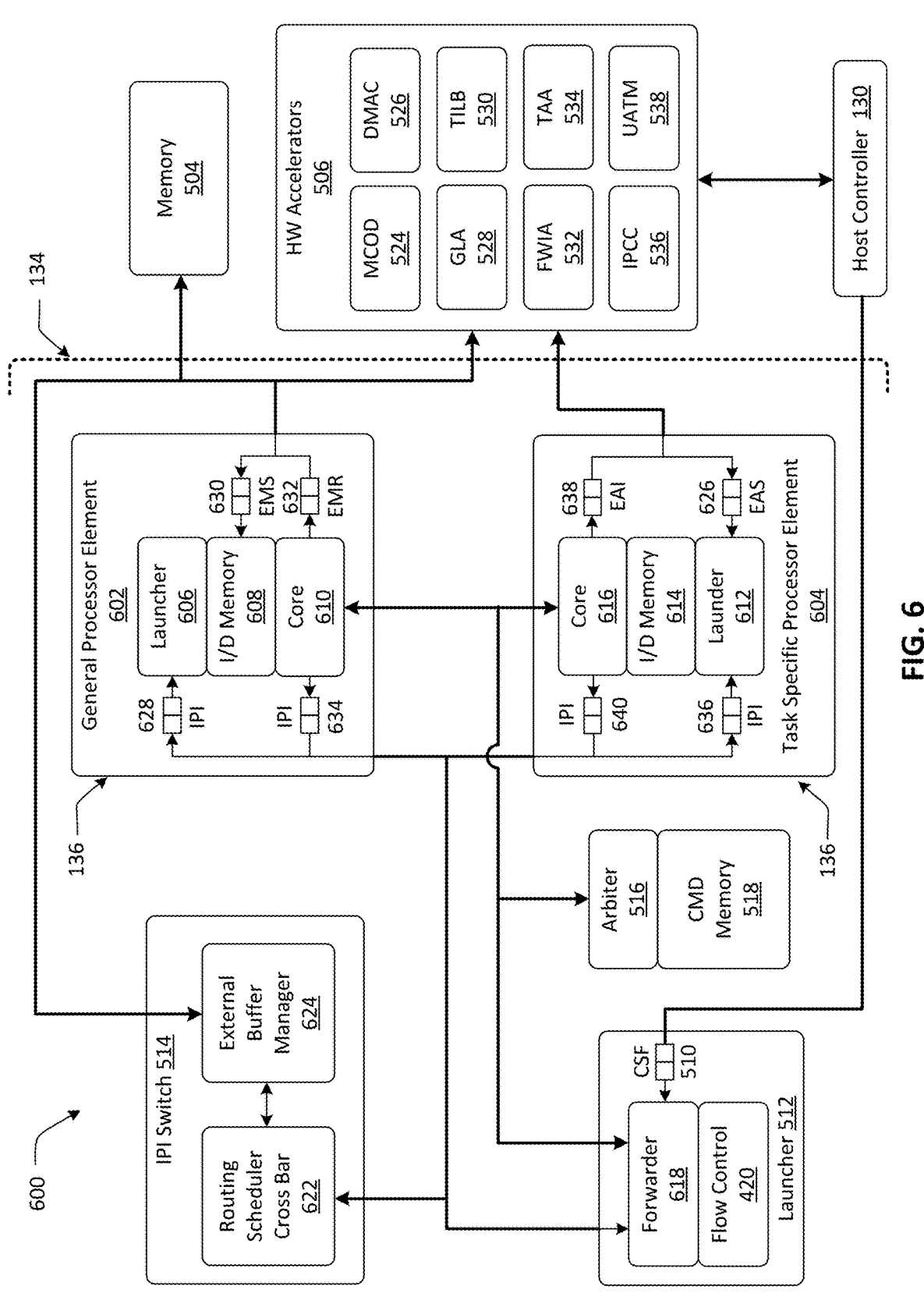
FIG. 6 illustrates an example configuration of processor elements of a FPA in accordance with some implementations of the disclosure.

FIG. 6 illustrates at 600 an example configuration of processor elements of a FPA in accordance with various aspects. As described herein, a FPA 134 may include multiple processor elements 136 (or processing units) that are configured based on microcode or instructions loaded into memory of the processor elements. In aspects, the processor elements 136 of a FPA 134 may be selectively grouped to form multiple processing stages, with each of the multiple stages configured to implement one or more processing functions or tasks depending on respective microcode loaded into the processor elements for execution. Thus, behavior and performance of the FPA 134 is configurable by the firmware 132 or a processor management entity of a storage controller based on the groupings of the processor elements 136 and microcode loaded into the processor elements of each stage of the FPA.

As shown in FIG. 6, a FPA 134 can be implemented with multiple types of processor elements 136, which may include general processor elements (GPEs) 602 and task specific processor elements (SPEs) 604. For visual brevity, although one GPE 602 and one SPE 604 are shown, a FPA 134 may be implemented with any suitable number (e.g., 20-50 processor elements) or combination of GPEs 602 and SPEs 604, which may be configured and used as described throughout this disclosure. In aspects, a GPE 602 may include a launcher 606 to receive commands, an instruction/data (I/D) memory 608 for storing instructions, commands, and data, and a processor core 610 for executing microcode and processing data. Alternatively or additionally, an SPE 604 may include a launcher 612 to receive commands, an instruction/data (I/D) memory 614 for storing instructions, commands, and data, and a processor core 616 for executing microcode and processing data. The GPE 602 and SPE 604 may be coupled to a host controller 130, memory 504, hardware accelerators 506, IPI switch 514, launcher 512, arbiter 516, and command memory 518, which may be implemented as described with reference to FIGS. 1-5 or throughout the disclosure. Further implementations of an FPA, or pipelined processor, architecture are described in copending U.S. patent application Ser. No. 18/612,608, entitled "Pipelined Processor Architecture with Configurable Grouping of Processor Elements," filed Mar. 21, 2024, which is hereby incorporated herein in its entirety. In this example, a launcher 512 includes a command forwarder 618, flow control block 620, and a CSF 510, and an IPI switch 514 includes a routing scheduler crossbar 622 and an external buffer manager 624, which is coupled to the memory 504, hardware accelerators 506, and the GPE 602.

In aspects, the CSF 510, FWIA 532, or IPCC 536 may be used to initiate activities of a FPA 134, such as when processing host commands, processing data, transferring data, or the like. In some cases, the host controller 130 forwards a recently fetched host command (e.g., entire command information) to the FPA 134 through the CSF 510 of the launcher 512. The host controller 130 can also assign a command index to the host command, which are transferred together to the CSF 510. In other cases, the host controller 130 forwards a host command that has been previously processed by the FPA 134 back to the FPA through the FWIA 532. The FWIA 532 can be configured to forward a message or notification to an SPE 404 that handles traffic originating or routed from the FWIA 532. The SPE 404 operably coupled to the FWIA 532 may receive the message or notification from the FWIA 532 as an external accelerator status (EAS) 626.

In some aspects, the firmware 132 forwards any host command that has been previously processed by the FPA 134 back to the FPA 134 for further action. For example, the firmware 132 can send an inter-processor interaction packet (IPI packet) to the FPA 134 through the IPCC 536. The IPCC 566 can be configured to forward the IPI packet to an SPE 604 that handles traffic originating or routed from the IPCC 536. The SPE 604 operably coupled to the IPCC 536 may receive the IPI packet from the IPCC 336 as another external accelerator status (EAS) 426.

Generally, the processor launcher 512 of the FPA 134 can receive or obtain requests and/or commands from the CSF 510. In aspects, the launcher 512 constructs an IPI packet based on information loaded into registers of the launcher 512 by the firmware 132. The launcher 512 can initialize a command memory entry of the command memory 518 that corresponds to the command index provided with information of the command. The launcher 512 then sends the constructed IPI packet to the IPI switch 514, which in turn may deliver the IPI packet 628 to one of the GPEs 602 in accordance with routing information of the IPI packet.

When a GPE 602 receives an IPI packet, the GPE 602 can load an internal program counter (not shown) of the processor element (e.g., instruction pointer) and a command index register (not shown) according to information of the IPI packet. The GPE 602 may then initiate processing of the command by executing targeted instructions from the I/D memory of the GPE 602. Based on the command index of the IPI packet, the GPE 602 may also access command information associated with the IPI packet in the command memory 518 or access the system memory 304 via an AXI interface (e.g., external memory status (EMS) 630 or external memory read (EMR) 632). When the GPE 602 determines to initiate processing via the hardware accelerators 56, the GPE 602 uses a specialized instruction to offload the processing task to an SPE 604 that is configured to access the hardware accelerators 506. By so doing, the GPE 602 passes processing of the command over to the SPE 604, thereby enabling the GPE 602 to immediately work on other commands without waiting for the hardware accelerators 506 to complete processing of the command. In some cases, the firmware 132 offloads or delegates command processing of the IPI packet 634 to another one of the GPEs 602 using the same specialized instruction.

In aspects, the GPE 602 or CPU 210 may execute this specialized instruction to construct an IPI packet that includes routing information of a selected one of the GPEs 602 or SPEs 604, as well as information related to the task to be offloaded or transferred (e.g., external activity). When the instruction generates or constructs an IPI packet for an SPE 604, the IPI packet may also include information (e.g., return information) for returning the task or results of the task back to a processor element from which the command or packet originated. Alternatively or additionally, the return information may specify a next GPE 602 to continue processing the command or IPI packet after the offloaded or transferred task is completed by the SPE 604 or hardware accelerator 506. After construction or generation of the IPI packet for offloading the task, the IPI packet is submitted to the IPI switch 514 and the IPI switch 514 routes the IPI packet to the destination GPE 602 or SPE 604 of the FPA 134. These operations may be repeated when the destination for the IPI packet is a GPE 602, such to return the processed IPI packet to an originating processor element or to continue processing the command until returned to the firmware or host controller. Alternatively or additionally, the GPE 602 may also offload processing of a command, packet, or data directly to one of the hardware accelerators 506 via the AXI interface that couples the FPA 134 to the hardware accelerators.

With respect to the SPEs 604 of the FPA 134, an SPE 604 may include an arbiter (not shown) as part of the launcher 612 that can select IPI packets 636 or EASs 626 received by the SPE 604 for processing. For example, with the SPE 604 detects incoming an IPI Packet 636 or an EAS 626, the arbiter may automatically implement arbitration to select one of the IPI packet or EAS for processing. To indicate selection, the arbiter may set an internal flag to identify the selected packet or status for processing. In the context of processing an IPI packet, the SPE 604 can load a command index register according to the received IPI Packet and execute instructions from the I/D memory 614 that are associated with an IPI Packet handling sequence. Because the SPE 604 obtains the command index, the SPE 404 can access host command information in the command memory 518 of the FPA 134. In some cases, the SPE 604 constructs an external accelerator interaction (EAI) packet 638 that is configured to activate and use one of the hardware accelerators 506 in accordance with the instructions and/or the information provided by the IPI packet. In such cases, another instruction can be configured to trigger the SPE 604 to send the EAI packet 638 to the hardware accelerator 506 to which the SPE 504 is operably coupled.

Based on the type of hardware accelerator 506 selected or coupled to the SPE 604, the SPE 604 may assign a unique request identifier (request ID) to the EAI packet when transmitted to the hardware accelerators. The SPE 604 may also store or save the current IPI packet within an internal request table according to the request ID. For example, these steps may be implemented for EAI packets when the packet is not routed to the FWIA 632 or IPCC 536, which may treat the packet as an IPI packet. For those hardware accelerators, the EAI packet can be forwarded to firmware from the IPCC 536 or the packet can be forwarded to the host controller 130 from the FWIA 532. Although the host command has exited the FPA 134, the FPA may still maintain the associated command information of the packet in the command memory 518.

Generally, the hardware accelerators 506 are configured to execute the EAI packet after the packet is received from the SPE 604 or another source. The hardware accelerators 506 may also be configured to, after completing execution of the packet, generate an external accelerator status 626 back to the SPE 604 from which the packet is received. This returned EAS 626 may include the request ID associated with the EAI packet 638 and stored by the request table of the SPE 604. As noted, the SPE 604 of the FPA 134 can process an IPI packet 636 or an EAS 626. Assuming an EAS 626 is selected by the internal arbiter and the SPE 604 is operably coupled with the FWIA 532 or IPCC 536, the SPE 604 may treat the EAS in the same fashion as an IPI packet. In other cases, the SPE 604 accesses the request table to identify the request ID associated with the EAS to the corresponding IPI packet from internal memory.

When processing the EAS 626, the SPE 604 can load an internal command index register (not shown) according to the EAS or retrieved information. The SPE 604 then initiates execution of the instructions that are related to an EAS handling or processing sequence. Because the SPE 604 has the command index associated with the packet, the SPE 604 can access the host command information stored in the command memory 518 using the command index. In some cases, an instruction is configured to trigger the SPE 604 to construct a new IPI packet 640 based on the returning information of the current IPI Packet. Upon completion of constructing the IPI packet 640, the SPE 604 can send the IPI packet to the IPI switch 514 for routing to a selected GPE 602 or another component of the FPA 134 as described herein. These are but a few ways in which the components of the FPA 134 can interact to implement various storage controller operations, others of which are described herein.

The activities of the FPA can be initiated by a number of methods. A first method is via a CSF, through which the Host Controller 130 can forward the newly fetched host command (entire command information) to the FPA. The Host Controller 130 may assign a Command Index to the newly fetched host command. A second method is using a FWIA 532. The Host Controller 130 can forward any existing host command that has been processed by the FPA before to the FPA through the FWIA 532. The FWIA 532 forwards a message/notification to a Task Specific Fast Path Processor (SFPU) 604 that handles the FWIA 532 traffic. The SFPU 604 that is connected to the FWIA 532 treats the message/notification as an EAS. A third method is through an IPCC 536. The firmware can forward any existing host command that has been processed by FPA before to the FPA. One easy way is to send an Inter-Processor Interaction Packet (IPI Packet) to the FPA through IPCC 536. The IPCC 536 forwards the IPI Packet to a SFPU 604 that handles the IPCC traffic. The SFPU 604 that is connected to the IPCC 536 treats the IPI Packet as an EAS.

The CSF 510 may also be used to interact with the FPA. In aspects, the CSF 510 is used by the HCT 130 to send a request (i.e., Command Submission Request (CSR)) to the FPA. The request not only registers the host command to the FPA but also delivers the host command information to the FPA. The request is handled by the FPA Launcher 512. In some implementations, the FIFO may be designed to be an asynchronized FIFO because the FPA may run at different clock frequency than the HCT 130. The FIFO adopts a local FIFO interface.

In some implementations, the FIFO may be protected by a SECDED (Single Error Correction Double Error Detection) code. The output side (consumer side) of the FIFO may have a 2-bit error signal to indicate whether the popped data has encounter correctible or uncorrectable error. The input side (producer side) of the FIFO, on the other hand, may have a 1-bit poison signal to indicate whether the pushed data is garbage. The poisoned data would generate an uncorrectable error at the output side of the FIFO when it is popped out from the FIFO. In general, the HCT 130 would use the poison signal when it has encountered error during the transfer of the CSR. Since the CSF 510 is used for the communication between hardware modules, the firmware is unable to interact with FPA using this FIFO.

In some implementations, the firmware may enable FPA-related configurations in the HCT 130, such that the HCT 130 can send a request to the FPA.

A Table List Memory (TLM) stores the basic structural information of the firmware defined tables in the external memory (i.e., system memory). For the table to become accessible by any hardware components within the Command Automation Controller (CAC), such as FPA and GLA 528, the firmware may register the table to the Table List Memory. In addition, the table may be placed in a system memory location that is accessible by the CAC's AXI port(s). The data structure of the Table List Memory is described herein. In general, the firmware defined table can be categorized into 3 major types: Regular Type, Range Type, and Exact Value Type.

The Regular Type Table (or Regular Table) does not have any logical and physical structure requirements. This kind of table is basically treated as a regular memory space by the hardware. The firmware can freely define the table structure and the content within the table. The Range Type Table (or Range Table) and Exact Value Type Table (or Exact Value Table), on the other hand, requires specific table format. Every table entry of the Range Table and Exact Value Table comprise a Header (i.e., Table Header) and Payload (i.e., Table Payload). The firmware may specify the size of the Table Header and Table Payload when it registers its table to the Table List Memory. In the current implementation, the size of the Table Header can only be 32-bit, 64-bit, and 128-bit. The size of the Table Payload is defined in byte and can only be power of two ($2^n$) value. The detail of the table format and layout are described throughout copending U.S. application Ser. No. 18/612,608.

The firmware can access the Table List Memory at any time. The entire Table List Memory may, in some implementations, be directly mapped to the FPA's advanced high-performance bus (AHB) slave port. It is also indirectly mapped to the FPA register space. Although the AHB access has less access latency than the register access, the AHB access may not guarantee the atomicity of the access unless the firmware locks the Table List Memory through a dedicated register. If the firmware wants to ensure that the update of a Table List Memory Entry is an atomic operation, it is recommended to program the Table List Memory through FPA register because locking the memory may significantly impact the performance of the FPA. The Table List Memory can also be accessed (read only) by hardware accelerator through a local memory interface. The firmware may be unable to interact with Table List Memory using this local memory interface.

A Divisor List Memory (DLM) stores the divisors that are required by one of the Micro Code instructions (i.e., Divide Recursive instruction). The Divisor List Memory is a centralized memory which shared by all the General Fast Path Processing Units (GFPU). If the firmware plan to use the Divide Recursive instruction in any GFPU, the firmware may provide the divisor(s) that is involved in the division to the Divisor List Memory during initialization. The Divisor List Memory may have a set number of memory entries and can only hold up to that number of divisors. The data structure of the Divisor List Memory and other associated aspects are described throughout this disclosure. The entire Divisor List Memory may be indirectly mapped to the FPA register space and can be accessed through dedicated registers.

Figure 7:
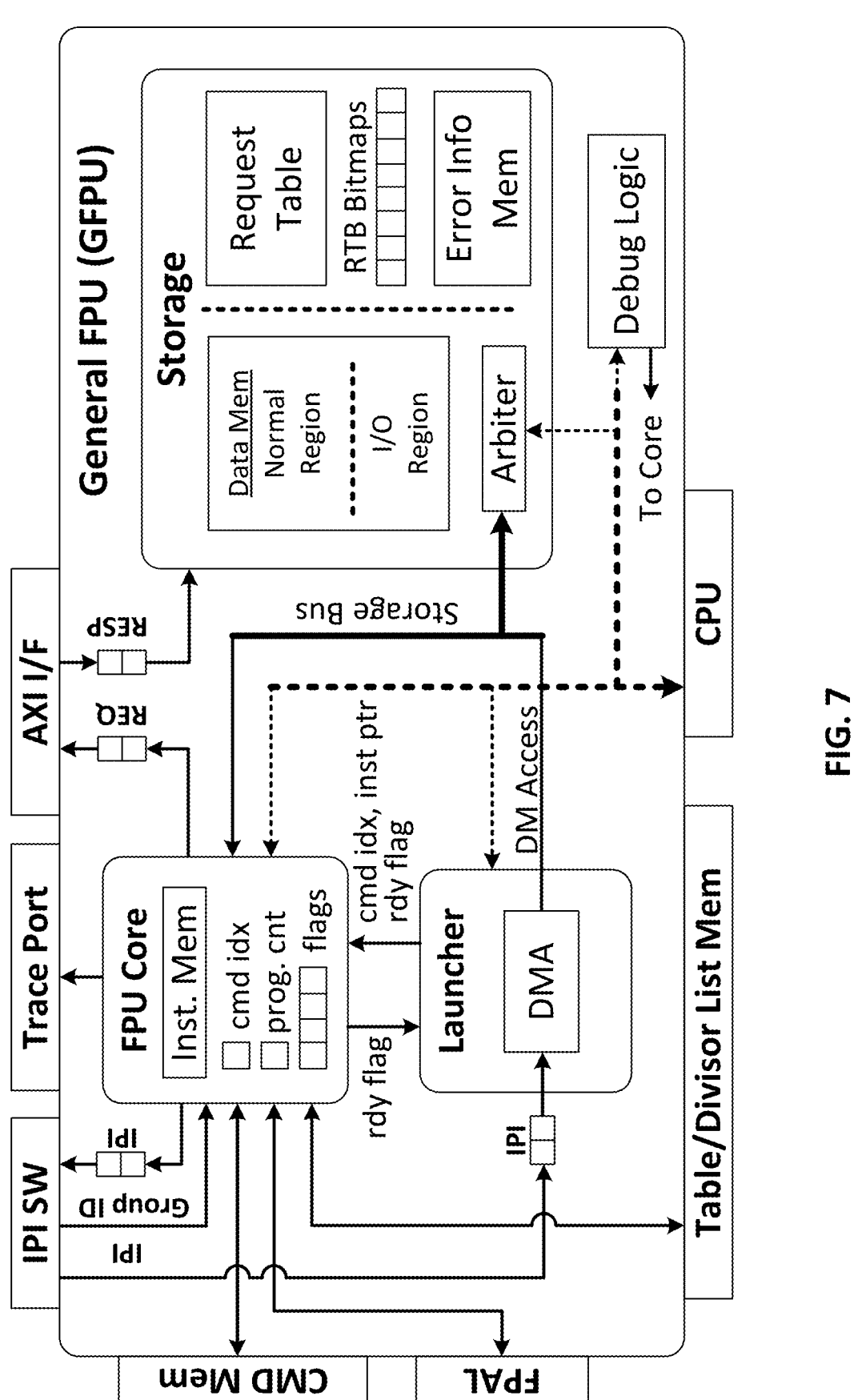
FIG. 7 illustrates an example architecture of a General Fast Path Processing Unit (GFPU), in accordance with some implementations of the disclosure.
Figure 8:
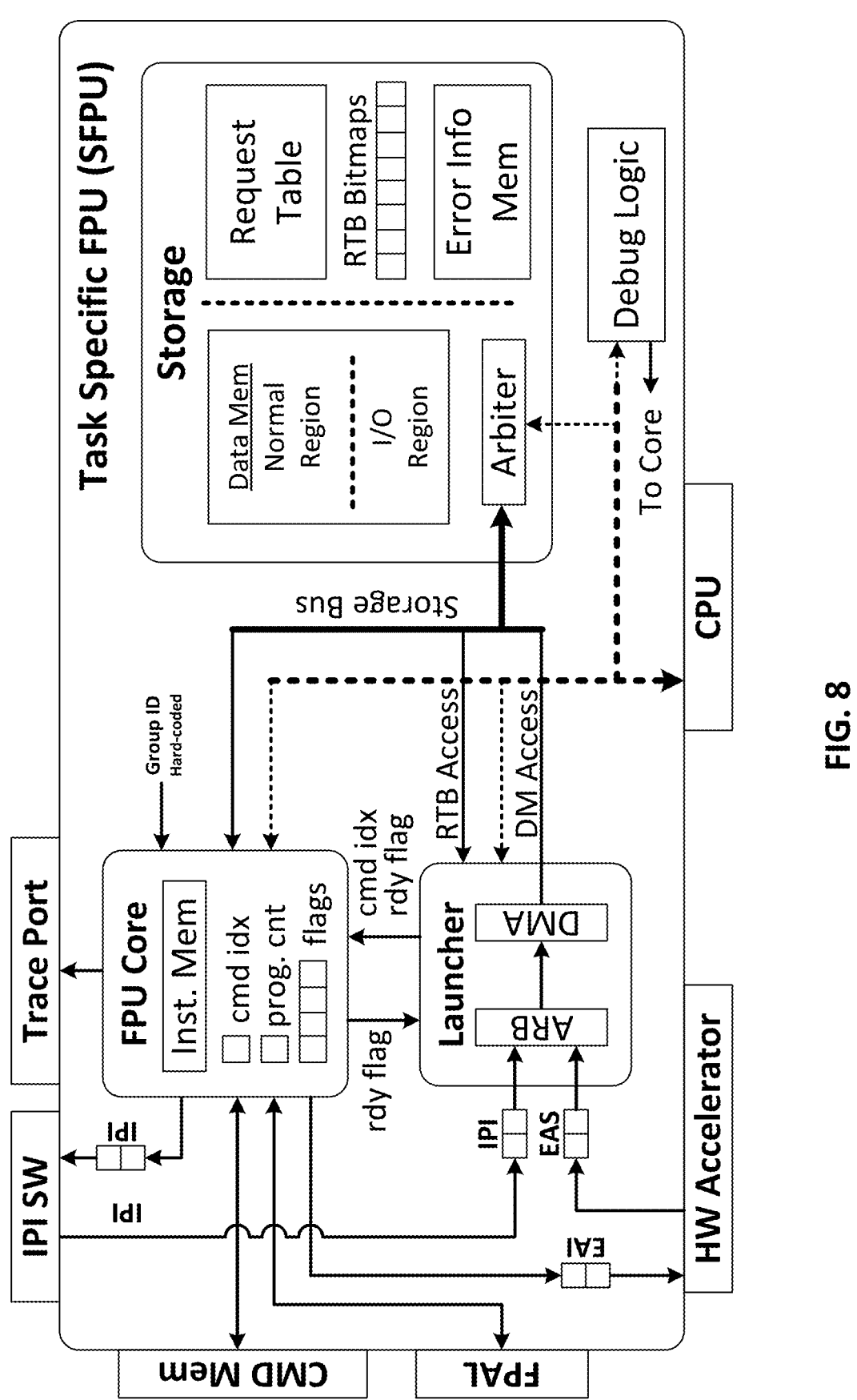
FIG. 8 illustrates an example architecture of a Task Specific Fast Path Processing Unit (SFPU), in accordance with some implementations of the disclosure.

The Fast Path Processing Unit (FPU) may be a specially designed processor. It executes Micro Code which is constructed by the custom designed instructions. In general, there are two major types of FPU, General FPU (GFPU) and Task Specific FPU (SFPU). An illustrative architecture of GFPUs and SFPUs is shown in FIGS. 7-8. The SFPUs can be further categorized into different type depending on the hardware accelerator that is connected to the SFPU. Although GFPU and SFPU adopt different operational concepts, they all have very similar hardware architecture. All FPU contains 4 major components: Launcher, FPU Core, Data Memory, and Request Table. The following summarize the functionalities of each component. Some components may operate slightly different in a GFPU than in a SFPU.

The FPU Core executes the Micro Code Instructions from its Instruction Memory. The execution time of the instruction depends on the type of the instruction. Besides the hardware logics which can perform various mathematic operations and data manipulations, the FPU also contains the following important registers that are used during the execution of the Micro Code.

The Data Memory provides required storage space during the execution of the Micro Code. The Data Memory is divided into 2 regions: Normal Region and I/O Region. The size of each region may vary depending on the type of FPU. The Normal Region is located at the lower address region. It can be used freely as temporary storage for different kind of purposes. The I/O Region, on the other hand, is located at the higher address region. It is used to store the request that is fetched by the Launcher.

A General FPU (GFPU) is a primary processor that handles the main command processing of each pipeline stage. The GFPU can be considered as a passive device (i.e., event driven architecture). Its operational period is purely determined by the value of the Internal Packet Ready Flag (IPR Flag). When the IPR Flag transits from 0 to 1, the GFPU enters the Execution State. It starts to execute the instruction that is targeted by the fetched Inter-Processor Interaction Packet (IPI Packet). The GFPU stays in the Execution State as long as the IPR Flag is asserted. When the IPR Flag transits from 1 to 0, the GPFU automatically shuts down its FPU Core and enters the Slumber State.

The FPU Core can access the different memories according to the instruction during the execution of the Micro Code. An Instruction Memory stores the Micro Code (i.e., instruction) of the GFPU. The memory is only accessible by the FPU Core (read only). Normally, the FPU Core reads the instruction for execution according to its Program Counter. A specific instruction can also trigger the FPU Core to load content from the Instruction Memory to the Data Memory.

A Data Memory stores data that is needed by the executed Micro Code. The size of the Data Memory is 64 Dwords.

The first 52 Dwords (Dword 0 to 51) belongs to Normal Region. The rest of the 12 Dwords (Dword 52 to 63) belongs to I/O Region which is used to hold the IPI Packet. The entire memory is directly mapped to the FPU Core space and is accessible by the FPU Core (read and write).

A Command Memory holds the data/information that is related to the host command. Every host command owns a Command Memory Entry in the Command Memory. The size of a Command Memory Entry is 64 Dwords. When the Launcher loads the Command Index to the FPU Core, the Command Memory Entry that is associated to the Command Index is directly mapped to the FPU Core space. The FPU Core can only access (read and write) the mapped Command Memory Entry instead of the entire Command Memory.

An Error Information Memory stores the detail error information and hardware status when the GFPU detects error. The data structure and other associated aspects are described throughout this disclosure. A specific instruction may be used to trigger the FPU Core to load content from the Error Information Memory to the Data Memory.

The FPU Core is capable of accessing (reading and writing) one or more external memories (i.e., system memory) through its AXI port. The FPU Core may read the Table List Memory (see above) to obtain address information before the AXI request is issued. If the Table List Memory is involved, the address information is not saved/stored in any other storages (such as Data Memory) that are accessible by the FPU Core.

Global Counters are generic counters that can be used for any kind of purpose. These counters may accessed by the FPU Core.

A Timestamp Counter (also known as Timestamp Timer) is a 32-bit free-running counter (i.e., timer). The timer does not reside in the FPA and is imported from the SoC. The timer may be the same timer that is used by the Host Controller (HCT) to timestamp the fetched host command. The timer may be reset to Oh when it reaches to its maximum value. The value of the counter is constantly broadcasted to all the FPUs and can be sampled by the FPU Core. The firmware can read the counter through a dedicated register.

A Task Specific FPU (SFPU) is a secondary processor that communicates with hardware accelerator and offloads the workload from the General FPU. Every SFPU is connected to a specific hardware accelerator. Its main task is to build the hardware accelerator's command and analyze the hardware accelerator's returned status. This section describes the SFPU in more detail. To shorten the description, the HWA refers to the hardware accelerator that is connected to the SFPU throughout this section.

The SFPU can be considered as an active device (i.e., polling architecture). It can constantly stay in the Execution State and expect the underlying Micro Code to poll the value of 2 internal flags: Internal Packet Ready Flag (IPR Flag) and External Status Ready Flag (ESR Flag). An asserted IPR Flag indicates that the SFPU has accepted an Inter-Processor Interaction Packet (IPI Packet) from the IPI Switch. An asserted ESR Flag, on the other hand, indicates that the SFPU has accepted an External Accelerator Status (EAS) from the Hardware Accelerator (HWA). Since the SFPU can only process one task at a time, the 2 flags are never asserted at the same time. To shorten the description, the Ready Flags refer to either or both IPR Flag and ESR Flag.

The Micro Code of the SFPU may contain sequences to process both IPI Packet and EAS. When the Micro Code detects a change of the Ready Flag (from 0 to 1), the Micro Code may instruct the SFPU to execute the proper sequence according to the Ready Flag (i.e., IPR Flag or ESR Flag). Once the execution of the sequence is completed, the Micro Code may clear the Ready Flag and then start polling and checking the Ready Flags again. The polling scheme can cause unnecessary power consumption, especially when the SFPU does not have a lot of workloads. To solve this issue, the Shut Down instruction can be used to transform the SFPU to a passive device (i.e., event driven architecture) after the Ready Flag is cleared. In general, the Shut Down instruction forces the FPU Core to enter the Slumber State. As soon as the Launcher sets the Ready Flag, the FPU Core is waked up and continues the execution of the Micro Code. The Shut Down instruction may not change the value of the Program Counter.

The SFPU may be initialized after a reset event. The initialization procedure is described later in this section. Once the SFPU is initialized, the FPU Core can be in either Execution State or Slumber State (determined by the Micro Code). The Ready Flags may be cleared. The de-asserted Ready Flag would trigger the Launcher to fetch request (i.e., IPI Packet or EAS), if available, from either the IPI Switch or HWA according to the Round Robin arbitration scheme (more detail is described later in this section). The SFPU may assumes that the IPI Switch's request requires a Request Table Entry. To avoid deadlock, the Launcher considers the availability of the Request Table (if exist) and External Accelerator Interaction FIFO (EAI FIFO) during the arbitration. If the Request Table is fully occupied, the launcher only accepts the request from the HWA.

If the firmware wants to have full control of the arbitration, it can switch the Launcher from Normal Mode (default configuration) to Manual Mode through a dedicated register during initialization. This feature may only be used when the SFPU is an active device which does not use the Shut Down instruction. In other words, the Shut Down instruction may be prohibited to avoid deadlock situation if this feature is enabled. Since the Launcher no longer can be triggered by the Ready Flag to fetch and load the request (i.e., IPI Packet or EAS), the Micro Code may use the Internal Packet Load instruction or External Status Load instead to initiate the Launcher's activities. In addition, the Micro Code may use the Jump I/O Flag instruction to monitor the existence of any incoming request before issuing the internal Packet Load or External Status Load instruction. This can help avoid execution time-out from happening. As soon as the Launcher has performed all the following operations, it sets the Ready Flag that corresponds to the request (IPI Packet or EAS) to wake up the FPU Core (if under Slumber State). After the Ready Flag is set, the Launcher returns to idle.

When fetching and loading an IPI packet, the Launcher zeroizes a specified memory region of the Data Memory. The Launcher loads the fetched IPI packet into the I/O Region of the Data Memory and loads the Command Index from the IPI Packet Header to the Command Index Register of the FPU Core. After clearing all the Execution Flags of the FPU Core, the Laucher resets the Execution Timer. The IPCC SFPU may update the Program Counter of the FPU Core if the IPI Packet is used to deliver error information. In some implementations, zeroization of the Data Memory occurs prior to the loading of the IPI Packet. An Internal Packet Load instruction provides options for the firmware to ski some of the above operations.

When fetching and loading External Accelerator Status (EAS), the Launcher again beings by zeroizing a specified memory region of the Data Memory. The fetched EAS is loaded into the starting location of the I/O Region of the Data Memory. If the Request Table is involved, the Launcher retrieves the saved content from the Request Table to the last 12 Dwords of the I/O Region of the Data Memory according to the Request ID of the EAS. The first Dword of the retrieved content may contain the Command Index at the least significant bits. The Launcher may load the Command Index to the Command Index register of the FPU Core. If, however, the Request Table is not involved, the EAS is handled in a similar way as the IPI Packet as discussed above. The Command Index from the least significant bits of the first Dword of the EAS is loaded into the Command Index register of the FPU Core. The Launcher then clears all the Execution Flags of the FPU core and rests the Execution Timer. If the I/O Region does not have enough space, the EAS would be over-written by the retrieved Request Table content. In some implementations, zeroization of the Data Memory occurs prior to the loading of the EAS and retrieving of content from the Request Table. An External Status Load instruction provides the option for the firmware to skip initialization of the Data Memory.

The Ready Flag is cleared by the instruction of executed Micro Code. In the current implementation, there are 3 type of instructions which can clear the Ready Flag. The most commonly used instructions are the Internal Packet Send instruction and External Packet Send instruction. The Internal Packet Send instruction hands over the command processing to another FPU by delivering an IPI Packet from the Data Memory to IPI Switch. The External Packet Send instruction, on the other hand, hands over the command processing to the HWA by sending an External Accelerator Interaction Packet (EAI Packet) from the Data Memory to HWA. The EAI Packet is also known as External Packet. It is basically the command that is supported by the connected HWA. The I/O Management field of Internal/External Packet Send instruction can determines whether the Ready Flag should be cleared after the IPI Packet or accelerator command is sent. Another instruction is the Flag Write instruction which can directly modify the values of all the internal flags. Before the FPU Core clears the Ready Flag, it may make sure that all the outstanding memory accesses are completed.

The FPU Core can access the following memories according to the instruction during the execution of the Micro Code. An Instruction Memory stores the Micro Code (i.e., instruction) of the SFPU. The memory is only accessible by the FPU Core (read only). Normally, the FPU Core reads the instruction for execution according to its Program Counter. A specific instruction can also trigger the FPU Core to load content from the Instruction Memory to the Data Memory.

A Data Memory stores data that is needed by the executed Micro Code. The size of the Data Memory is 64 Dwords. The sizes of the Normal Region and I/O Region are determined by a Region Pointer which may be provided by the firmware through the Group Configuration Table during initialization. All the SFPUs that are under the same SFPU Group have the same Region Pointer configuration. Usually the I/O Region is large enough to hold both EAS and IPI Packet at the same time. In other words, the Region Pointer may be configured based on the sum of the EAS size and IPI Packet size. However, if the SFPU is not equipped with a Request Table, the I/O Region only needs to hold either EAS or IPI Packet at a time. Therefore, the Region Pointer may be configured based on the largest value among EAS size and IPI Packet size.

A Command Memory holds the data/information that is related to the host command. Every host command owns a Command Memory Entry in the Command Memory. The size of a Command Memory Entry is 64 Dwords. When the Launcher loads the Command Index to the FPU Core, the Command Memory Entry that is associated to the Command Index is directly mapped to the FPU Core space. The FPU Core can only access (read and write) the mapped Command Memory Entry instead of the entire Command Memory.

Error Information Memory stores the detail error information and hardware status when the SFPU detects error. The data structure and other associated aspects are described throughout this disclosure. A specific instruction may be used to trigger the FPU Core to load content from the Error Information Memory to the Data Memory.

A Timestamp Counter (also known as Timestamp Timer) is a 32-bit free-running counter (i.e. timer). The timer does not reside in the FPA and is imported from the SoC. The timer may be the same timer that is used by the Host Controller (HCT) to timestamp the fetched host command. The timer may be reset to 0h when it reaches to its maximum value. The value of the counter is constantly broadcasted to all the FPUs and can be sampled by the FPU Core. The firmware can read the counter through a dedicated register.

As used herein, the source data may refer to the data that is stored at the source location and the destination data may refer to the data that is stored at the destination location. In various aspects, processing units of the FPA architecture execute various data instructions (or commands) that enable the manipulation or processing of any suitable data. In some cases, an instruction set of the FPA architecture comprises data instructions that enable the access, manipulation, or processing of data with fewer clock or instructions cycles, which may enable more efficient data processing.

In aspects, a processing unit or firmware of an FPA-based device may implement a divide recursive (DIVR) instruction which performs unsigned divisions recursively and obtains the remainder of each division. This instruction may be executed to, for example, convert a logical address into a physical address. The instruction may include references to data stored in memory that can be used as operands in the recursive division operation. There are 4 main operands for this instruction: Number of Iteration, Data 0, Data 1, and Result. The pseudocode of the entire operation is shown below. The Number of Iteration specifies the total number of divisions that are to be performed. The Data 0 Operand is the initial dividend. The bit length of the Data 0 Operand can be either 32-bit or 64-bit. The Data 1 Operand holds a group of divisors. The number of divisors depends on the Number of Iteratio'.

$$\text{Quotient } 0 = \text{Data } 0;$$

$$\text{For } (i = 0; i \le N; i++)$$

$$\{\text{Result } i = \text{Quotient } i \% \text{ Divisor } i; \quad \text{Quotient } i + 1 = \text{Quotient } i/\text{Divisor } i\}$$

$$\text{Result } N + 1 = \text{Quotient } N + 1;$$

The Result Operand holds the remainder of each iteration (i.e. division). It may also contain the quotient of the last division (if enabled by this instruction). The quotient (if exist) is located at the most significant side of the Result Operand. The bit length of the quotient is the same as the bit length of the Data 0 Operand. The remainders are located at the least significant side of the Result Operand. The bit length of each remainder is 32-bit. If the divisor is a 16 bit number, the most significant 16 bits of the remainder is 0h. The reminder that is generated in the earlier iteration is placed at the lower Dword (i.e. 32-bit) location of the Result Operand. All operands are in little endian format (the least significant bit is located at the lower Dword offset).

In aspects, the DIVR instruction may continue tracking remainders, quotient, and divisors in respective registers or memory locations (e.g., data memory, data memory, and/or divisor list, respectively) enabling efficient division operations. In some cases, the aspects of recursive division described herein may enable division operations that operate up to four times faster than preceding methods.

The Data 1 Operand is located in the Divisor List Memory. The Data 0 and Result Operands are in the Data Memory. The locations of Data 0 and Result Operands are allowed to be the same location in the Data Memory. If the operand is in the Data Memory, it may be placed in a contiguous space within the physical boundary of the Data Memory. The FPU does not allow the operand to wrap around in the Data Memory or Divisor List Memory.

It may take a long time to complete the execution of this instruction depending on the number of iterations. The instruction pipeline of the FPU Core may be halt by the internal Instruction Hazard Detector for a while. To improve the performance, the Instruction Hazard Detector does not wait until the completion of this instruction to unlock the entire Result Operand. Instead, it slowly unlocks Result Operation location during the execution of this instruction. In other words, the Result Operand location(s) is unlocked as soon as its corresponding division is completed, such that if the next instruction wants to invoke the reminder from earlier iteration (i.e. division), it is not halt until the completion of this instruction.

Figures 9, 10:
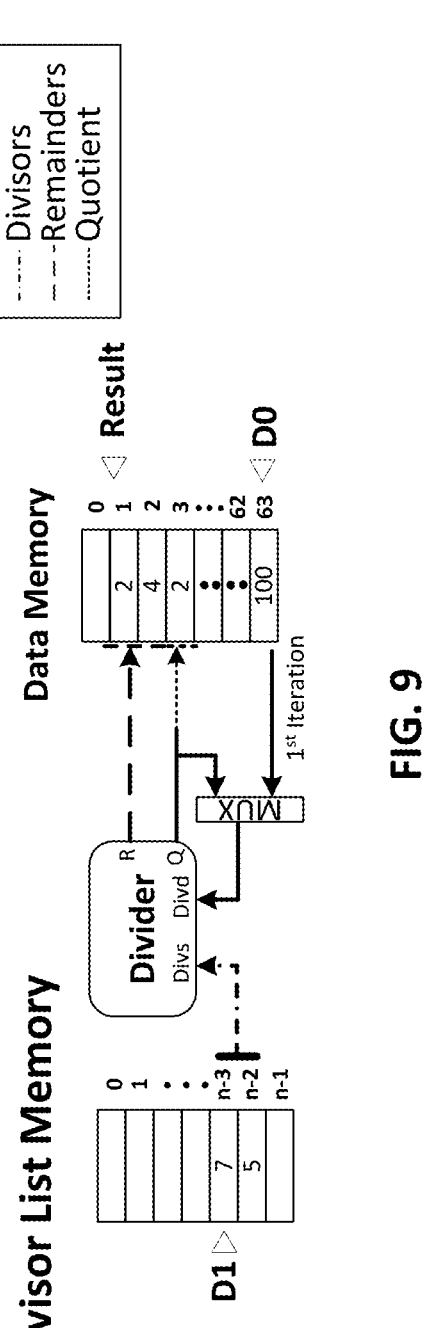
FIG. 9 illustrates an example a FPU configured to perform a recursive divide operation, in accordance with some implementations of the disclosure.
FIG. 10 illustrates an example layout of a recursive divide instruction, in accordance with some implementations of the disclosure.

FIG. 9 illustrates an example of this operation. In the example, the Number of Iteration is 2. Besides the remainders, the instruction also wants to obtain the final quotient. The Data 1 Operand (D1) contains 2 divisors, 7 and 5. The Data 0 Operand (D0) is the dividend and is a 32-bit number with a value of 100. The first division (or iteration) divides 100 by 7. The quotient is 14 and remainder is 2. The remainder is stored to the first Dword of the Result Operand. The Instruction Hazard Detector then unlocks the first Dword of the Result Operand. The second division (or iteration) divides 14 by 5. The quotient is 2 and remainder is 4. The remainder is stored to the second Dword of the Result Operand and the quotient is stored to the third Dword of the Result Operand. The Instruction Hazard Detector then unlocks the second and third Dword of the Result Operand.

This instruction is available to the GFPU. In aspects, a processing unit may take seventeen clock cycles in 64-bit operation (e.g., 17 FPU clock cycles or instruction cycles) or nine clock cycles in 32-bit operation (e.g., 9 FPU clock cycles or instruction cycles) to complete one division (or iteration). This instruction does not change the value of any internal flag in the FPU Core.

FIG. 10 illustrates the DIVR instruction layout. Bits 31-26 hold an opcode. This field identifies the instruction. Bit 25 is the Operand Type, which specifies the type of the Result Operand. Bit 24 is the Operand Size, which specifies the size, in bits, of the Data 0 Operand (i.e., dividend). Bits 23-20 specify the total number of divisions that need to be performed. The maximum value of this filed depends on the size of the Divisor List Memory and the value of the Data 1 Operand field of the instructions, which is discussed below. Bits 19-18 are reserved. Bits 17-12 are the Data 1 Operand, which specifies a pointer to the starting of a contiguous space in the Divisor List Memory. The pointed space holds the divisor(s). The number of divisors that is stored in the pointed space depends on the Number of Iteration field of this instructions. Each address of the Divisor List Memory holds a divisor. One division requires one divisor. The divisors are consumed from the lower address to the higher address of the pointed space.

In some implementations, the Divisor List Memory can only hold up to maximum number of divisors. In such implementations, the sum of the Number of Iteration field of this instruction and this field may be less than the size of the Divisor List Memory. For example, if the size of the Divisor List memory is 8 (i.e., 8 divisors) and the number of iteration field of this instruction is 5 (i.e., 6 divisions or iterations), the value of this field may be less than 3.

Bits 11-06 are the Data 0 Operand. This field specifies a pointer which points to the starting of a contiguous space (Dword) in the Data Memory. The pointed space holds the dividend. The bit length of the dividend depends on the value of the Operand Size field of this instruction. Finally, bits 05-00 are the Result Operand. This field specifies a pointer which points to the starting of a contiguous space (Dword) in the Data Memory. The pointed space may be divided into two portions depending on the Operand Type field of this instruction. The least significant portion of the pointed space is used to store remainder(s) of the division(s). The number of remainders depends on the Number of Iteration field of this instruction. One division generates one remainder. Every remainder occupies a Dword space. If the divisor is a 16-bit number, the most significant 16 bits of the remainder is 0 h. The reminder that is generated in the earlier iteration is placed at the lower Dword location. The most significant portion of the pointed space is used to store the quotient of the last division. This pointed space only exists when the Operand Type field of this instruction is 1 h. The bit length of the quotient is equal to the bit length of the Data 0 Operand (i.e., determined by the value of the Operand Size field of this instruction).

The DIVR instruction may be used to convert a logical address to a physical address. The Data 0 Operand may represent a logical address and the Divisor List Memory may include data corresponding to physical characteristics of a storage device, such as number channels (or dies), pages, blocks and so on. A logical address constructed based on this information can be converted to its corresponding physical address. Extending the example of FIG. 9, a storage device may have 8 dies, each with 6 pages of 8 blocks. All but the lowest level parameter (i.e., block) may be stored as divisors in the Divisor List Memory as zero-based numbers. In other words, the value of 7 stored at D1 in FIG. 9 corresponds to the eight dies of the storage device and the value of 5 stored in the adjacent location in the Divisor List Memory corresponds to the six pages in each die.

A logical address may be calculated for a memory location physically located at the third block of the fifth page on the third die using the following formula:

$$A_0 + (P_0 \times (A_1 + (P_1 \times A_2)))  \qquad \text{Eq. 1}$$

where $A_0$ is the physical location parameter identifying the die, $A_1$ is the physical location parameter identifying the page, $A_2$ is the physical location parameter identifying the block, $P_0$ is the number of dies, $P_1$ is the number of pages, and $P_2$ is the number of blocks. $P_0$ and $P_1$ may be stored in the Divisor List Memory before or after address conversion. A physical location of the third block of the fifth page on the third die gives $A_0$ a value of 2, $A_1$ a value of 4, and $A_2$ a value of 2. $P_0$ has a value of 7, $P_1$ has a value of 5. Using this equation, a logical address of 100 is calculated. If additional physical location parameters are needed, the equation may be expanded to include them, as follows:

$$A_0 + (P_0 \times \ \ldots \ (A_{N-2} + (P_{N-2} \times (A_{N-1} + (P_{N-1} \times A_N)))) \ \ldots \ ) \qquad \text{Eq. 2}$$

Logical addresses determined in this manner may be converted to back to their corresponding physical addresses using the recursive division methods described above. Performing the recursive division operation using a GFPU or SFPU may allow for conversion of the logical address to a physical address with fewer clock or instructions cycles, which may enable more efficient data processing.

Figure 11:
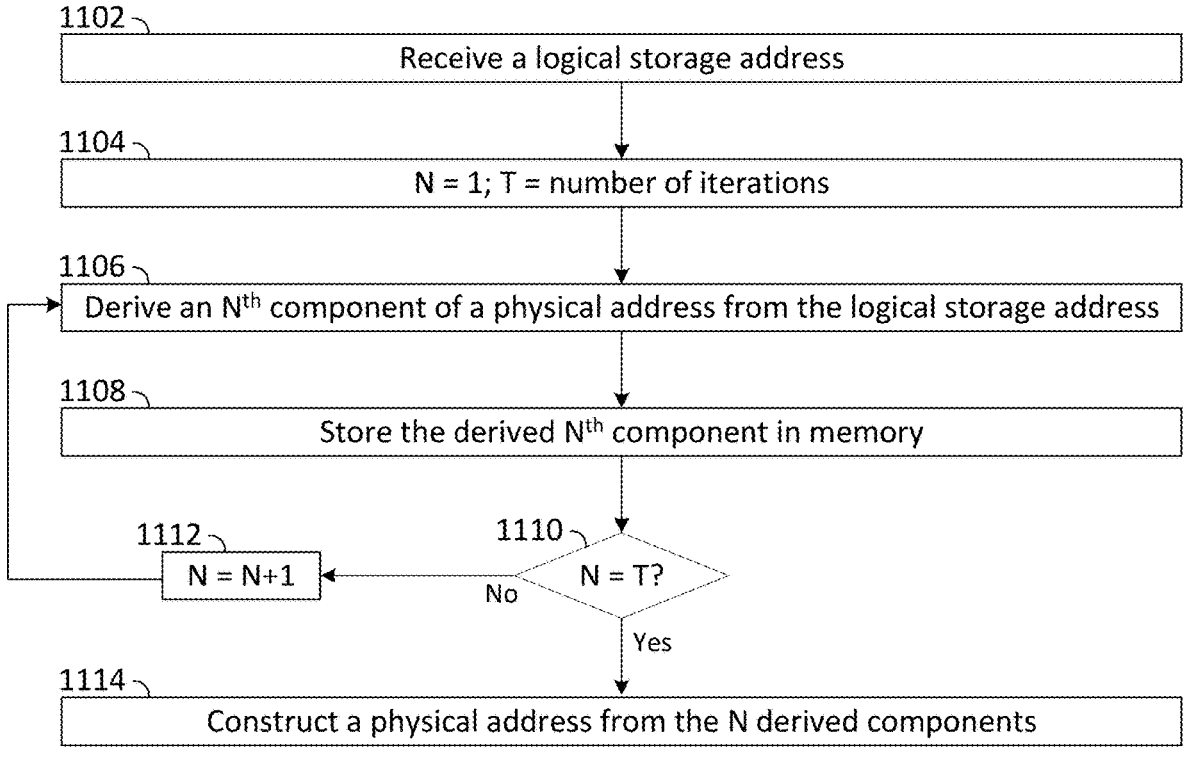
FIG. 11 is a flowchart representing an illustrative process for converting a logical storage address to a corresponding physical address, in accordance with some implementations of the disclosure.

FIG. 11 is a flowchart representing an illustrative process 1100 for converting a logical storage address to a corresponding physical address, in accordance with some implementations of the disclosure. At 1102, a processor (e.g., a GFPU) receives a logical storage address. In order to access stored data, the logical storage address is converted to a physical address. At 1104, the processor initializes a counter variable N, setting its initial value to one. The processor also initializes a variable T, representing the number of iterations through which the recursive division is to be performed. This number may be received along with the local storage address as part of an instruction to perform the recursive division.

At 1106, the processor derives an $N^{th}$ component of a physical address from the logical storage address. For example, in the first iteration the logical address value is divided by a divisor value retrieved from a memory. The remainder portion of the division operation represents the $N^{th}$ component of the physical address. The quotient portion of the divisional operation may be stored or passed back to the processor. In subsequent iterations, it is the quotient portion of the division operation from the previous iteration that is divided by a retrieved divisor value.

At 1108, the processor stores the derived $N^{th}$ component in a memory. At 1110, the processor determine whether N is equal to T, meaning that the recursive divide operation has been performed over the required number of iterations. If N is not equal to T ("No" at 1110), then, at 1112, the processor increments the value of N and processing returns to 1106.

If N is equal to T ("Yes" at 1110), then, at 1114, the processor constructs the physical address from the N derived components. For example, each derived component is retrieved from the memory and assembled to or used in sequence to identify a specific physical storage location.

Thus it is seen that a method and apparatus for performing a recursive division operation to access or manipulate data, such as deriving a physical address from a logical address, have been provided.

FIG. 12 is a flowchart representing an illustrative process 1200 for executing a command received at a first processor by a second processor using a hardware accelerator, in accordance with some implementations of the disclosure. At 1202, a first processor receives a command from a system component. In an illustrative example, the command is a host command to read data from, or write data to, a memory. However, the command may be any type of command or instruction suitable for execution by the processor. Before processing of the command can begin, the first processor (i.e., a GFPU or GFPU group) may perform a number of actions. For example, the first processor may validate the command, convert a logical address to a physical address, check for any conflicts and/or racing condition between host commands, and determine whether there are sufficient hardware resources available to support execution of the command.

At 1204, the first processor determines whether there is a second processor that can communicate with a hardware accelerator for assisting in execution of the command. For example, in the case of a host write command, the first processor would have to check whether there is any outstanding write command which also targets the same address. If a conflict occurs, the new command cannot be completed until the outstanding command has been completed. Depending on the number of outstanding commands, it may take a significant amount of time for the first processor to perform such a check. Thus, the first processor can use a hardware accelerator which is configured to perform the check in a much shorter period of time.

The first processor determines whether a second processor configured to communicate with the hardware accelerator is available. For example, the first processor may be a GFPU that is communicatively connected to one or more SFPUs, each respective SFPU being configured to communicate with a unique hardware accelerator. The GFPU may determine whether an SFPU is configured to communicate with the hardware accelerator.

If a second processor configured to communicate with the hardware accelerator for assisting in execution of the command is available ("Yes" at 1204), then, at 1206, the first processor instructs the second processor accordingly. Rather than the first processor constructing a hardware accelerator command and interacting directly with the hardware accelerator, the first processor offloads the task to the SFPU. At 1208, the SFPU then constructs the appropriate hardware accelerator command and sends it to the hardware accelerator associated with the host command. At 1210, the SFPU receives a result from the hardware accelerator and provides the result to the GFPU. The SFPU is configured to understand the structure of commands and status data defined by its attached hardware accelerator. The SFPU may convert the GFPU request to a hardware accelerator command. The SFPU may also convert the hardware accelerator status to a format understood by the GFPU. The SPFU may also analyze the status returned by the hardware accelerator and perform simple calculations of the returned status, if needed, before providing the results to the GFPU.

If there is no second processor available that is configured to communicate with the hardware accelerator for assisting in execution of the command ("No" at 1204), then, at 1212, the first processor executes the command on its own.

In some implementations, the first processor may transmit the command to the second processor by storing the command in a command memory and transmitting an IPI packet identifying an ID or storage location of the command to the IPI switch. The IPI switch may then route the IPI packed to the appropriate second processor for execution.

As used herein and in the claims which follow, the construction "one of A and B" shall mean "A or B."

It is noted that the foregoing is only illustrative of the principles of the invention, and that the invention can be practiced by other than the described implementations, which are presented for purposes of illustration and not of limitation, and the present invention is limited only by the claims which follow.

What is claimed is:

1. An apparatus comprising:

memory; and a processor configured to:

perform, for a predetermined number of iterations, a recursive divide operation on a logical storage address;

derive, on each iteration of the recursive divide operation, a respective component of a physical address represented by the logical storage address; and construct, from the derived respective components, the physical address corresponding to the logical storage address.

2. The apparatus of claim 1, wherein to derive, on each iteration, a respective component of the physical address represented by the logical storage address, the processor is further configured to:

retrieve, from the memory, a divisor associated with the respective component; and divide at least a portion of the logical storage address by the divisor to obtain a quotient and a remainder, wherein the remainder represents the respective component of the physical address and the quotient represents a portion of the logical storage address to be divided in a next iteration.

3. The apparatus of claim 2, wherein the processor is further configured to:

store the quotient from a first iteration; and retrieve the stored quotient in a second iteration, wherein the stored quotient is the at least a portion of the logical storage address to be divided in the second iteration.

4. The apparatus of claim 1, wherein the processor is further configured to store each derived respective component at a respective location in the memory.

5. The apparatus of claim 1, wherein the processor is further configured to receive a recursive divide instruction.

6. The apparatus of claim 5, wherein the processor is further configured to extract, from the recursive divide instruction, a number of iterations for which to perform the recursive divide operation, a first pointer identifying a location in a lookup table at which a list of divisors relevant to the recursive divide instruction begins, a second pointer identifying a location in the memory at which a first dividend is stored, and a third pointer identifying a location in the memory at which to begin storing dividends obtained from the recursive divide operation.

7. The apparatus of claim 1, wherein the physical address is based on characteristics of a storage device, and wherein the processor is further configured to:

determine the characteristics of the storage device; and store, in a lookup table, a plurality of values corresponding to the characteristics of the storage device.

8. The apparatus of claim 1, wherein the derived respective component of the physical address represents one of a channel, a die, a page, or a block to which the physical address points.

9. A method comprising:

performing, for a predetermined number of iterations, a recursive divide operation on a logical storage address;

deriving, on each iteration of the recursive divide operation, a respective component of a physical address represented by the logical storage address; and constructing, from the derived respective components, the physical address corresponding to the logical storage address.

10. The method of claim 9, wherein deriving, on each iteration, a respective component of the physical address represented by the logical storage address further comprises:

retrieving, from a memory, a divisor associated with the respective component; and dividing at least a portion of the logical storage address by the divisor to obtain a quotient and a remainder, wherein the remainder represents the respective component of the physical address and the quotient represents a portion of the logical storage address to be divided in a next iteration.

11. The method of claim 10, further comprising:

storing the quotient from a first iteration; and retrieving the stored quotient in a second iteration, wherein the stored quotient is the at least a portion of the logical storage address to be divided in the second iteration.

12. The method of claim 9, further comprising storing each derived respective component at a respective location in a memory.

13. The method of claim 9, further comprising receiving a recursive divide instruction.

14. The method of claim 13, further comprising extracting, from the recursive divide instruction, a number of iterations for which to perform the recursive divide operation, a first pointer identifying a location in a lookup table at which a list of divisors relevant to the recursive divide instruction begins, a second pointer identifying a location in a memory at which a first dividend is stored, and a third pointer identifying a location in the memory at which to begin storing dividends obtained from the recursive divide operation.

15. The method of claim 9, wherein the physical address is based on characteristics of a storage device, the method further comprising:

determining the characteristics of the storage device; and storing, in a lookup table, a plurality of values corresponding to the characteristics of the storage device.

16. The method of claim 9, wherein deriving the respective component of the physical address comprises deriving one of a channel, a die, a page, or a block to which the physical address points.

17. A non-transitory computer-readable medium having non-transitory computer-readable instructions encoded thereon for execution by a processor, the non-transitory computer-readable instructions comprising:

an instruction to perform, for a predetermined number of iterations, a recursive divide operation on a logical storage address;

an instruction to derive, on each iteration of the recursive divide operation, a respective component of a physical address represented by the logical storage address; and an instruction to construct, from the derived respective components, the physical address corresponding to the logical storage address.

18. The non-transitory computer-readable medium of claim 17, wherein the instruction to derive, on each iteration, a respective component of the physical address represented by the logical storage address further comprises:

an instruction to retrieve, from a memory, a divisor associated with the respective component; and an instruction to divide at least a portion of the logical storage address by the divisor to obtain a quotient and a remainder, wherein the remainder represents the respective component of the physical address and the quotient represents a portion of the logical storage address to be divided in a next iteration.

19. The non-transitory computer-readable medium of claim 18, wherein the non-transitory computer-readable instructions that are encoded further comprise:

an instruction to store the quotient from a first iteration; and an instruction to retrieve the stored quotient in a second iteration, wherein the stored quotient is the at least a portion of the logical storage address to be divided in the second iteration.

20. The non-transitory computer-readable medium of claim 17, wherein the non-transitory computer-readable instructions that are encoded further comprise an instruction to store each derived respective component at a respective location in a memory.

21. The non-transitory computer-readable medium of claim 17, wherein the non-transitory computer-readable instructions that are encoded are configured to be executed in response to receiving a recursive divide instruction.

22. The non-transitory computer-readable medium of claim 21, wherein the instructions that are encoded are further configured to cause the processor to extract, from the recursive divide instruction, a number of iterations for which to perform the recursive divide operation, a first pointer identifying a location in a lookup table at which a list of divisors relevant to the instruction begins, a second pointer identifying a location in a memory at which a first dividend is stored, and a third pointer identifying a location in the memory at which to begin storing dividends obtained from the recursive divide operation.

23. The non-transitory computer-readable medium of claim 17, wherein the instructions that are encoded further comprise:

an instruction to determine characteristics of a storage device; and an instruction to store, in a lookup table, a plurality of values corresponding to the characteristics of the storage device for determining the physical address.

24. The non-transitory computer-readable medium of claim 17, wherein the instruction to derive a respective component of the physical address comprises an instruction to derive, on each iteration of the recursive divide operation, one of a channel, a die, a page, or a block to which the physical address points.

25. An apparatus comprising:

means for performing, for a predetermined number of iterations, a recursive divide operation on a logical storage address;

means for deriving, on each iteration of the recursive divide operation, a respective component of a physical address represented by the logical storage address; and means for constructing, from the derived respective components, the physical address corresponding to the logical storage address.

26. The apparatus of claim 25, wherein the means for deriving, on each iteration, a respective component of the physical address represented by the logical storage address further comprises:

means for retrieving, from a memory, a divisor associated with the respective component; and means for dividing at least a portion of the logical storage address by the divisor to obtain a quotient and a remainder, wherein the remainder represents the respective component of the physical address and the quotient represents a portion of the logical storage address to be divided in a next iteration.

27. The apparatus of claim 26, further comprising:

means for storing the quotient from a first iteration; and means for retrieving the stored quotient in a second iteration, wherein the stored quotient is the at least a portion of the logical storage address to be divided in the second iteration.

28. The apparatus of claim 25, further comprising means for storing each derived respective component at a respective location in a memory.

29. The apparatus of claim 25, further comprising means for receiving a recursive divide instruction.

30. The apparatus of claim 29, further comprising means for extracting, from the recursive divide instruction, a number of iterations for which to perform the recursive divide operation, a first pointer identifying a location in a lookup table at which a list of divisors relevant to the recursive divide instruction begins, a second pointer identifying a location in a memory at which a first dividend is stored, and a third pointer identifying a location in the memory at which to begin storing dividends obtained from the recursive divide operation.

31. The apparatus of claim 25, wherein the physical address is based on characteristics of a storage device, the apparatus further comprising:

means for determining the characteristics of the storage device; and means for storing, in a lookup table, a plurality of values corresponding to the characteristics of the storage device.

32. The apparatus of claim 25, wherein the means for deriving the respective component of the physical address comprises means for deriving one of a channel, a die, a page, or a block to which the physical address points.

* * * * *